US008341103B2

(12) United States Patent
Adams et al.

(10) Patent No.: US 8,341,103 B2
(45) Date of Patent: Dec. 25, 2012

(54) METHOD AND SYSTEM FOR CONNECTING ANALYTIC NETWORK PROCESS MODEL (ANP) WITH FEEDBACK THROUGHOUT THE ANP MODEL BETWEEN SUB-NETWORKS

(75) Inventors: William James Louis Adams, DeLand, FL (US); Daniel Lowell Saaty, Falls Church, VA (US)

(73) Assignee: Decision Lens, Inc., Arlington, VA (US)

( * ) Notice: Subject to any disclaimer, the term of this patent is extended or adjusted under 35 U.S.C. 154(b) by 817 days.

(21) Appl. No.: 12/508,703

(22) Filed: Jul. 24, 2009

(65) Prior Publication Data
US 2011/0022556 A1    Jan. 27, 2011

(51) Int. Cl.
*G06F 17/00* (2006.01)
*G06N 5/02* (2006.01)
(52) U.S. Cl. ........................................................ 706/46
(58) Field of Classification Search .................. None
See application file for complete search history.

(56) References Cited

U.S. PATENT DOCUMENTS

| | | | |
|---|---|---|---|
| 5,844,817 A | 12/1998 | Lobley et al. | |
| 6,151,565 A | 11/2000 | Lobley et al. | |
| 6,502,126 B1 | 12/2002 | Pendakur | |
| 6,643,645 B1 | 11/2003 | Fayyad et al. | |
| 6,785,709 B1 | 8/2004 | Pendakur | |
| 6,850,891 B1 | 2/2005 | Forman | |
| 6,907,566 B1 | 6/2005 | McElfresh et al. | |
| 6,963,901 B1 | 11/2005 | Bates et al. | |
| 7,080,071 B2 | 7/2006 | Henrion et al. | |
| 7,203,755 B2 | 4/2007 | Zhu et al. | |
| 7,257,566 B2 | 8/2007 | Danielson et al. | |
| 7,353,253 B1 | 4/2008 | Zhao | |
| 7,542,952 B2 | 6/2009 | Yang et al. | |
| 7,552,104 B2 | 6/2009 | Hansen et al. | |
| 7,624,069 B2 | 11/2009 | Padgette | |
| 7,689,592 B2 | 3/2010 | Denton et al. | |
| 7,827,239 B2 | 11/2010 | Bodin et al. | |

(Continued)

FOREIGN PATENT DOCUMENTS
WO    WO 01/08070 A1    2/2001
(Continued)

OTHER PUBLICATIONS

Demirtas et al., "An integrated multiobjective decision making process for supplier selection and order allocation", Department of Industrial Engineering, Osmangazi University, 26030 Eskisehir, Turkey, Available online Feb. 28, 2006.

(Continued)

*Primary Examiner* — Jeffrey A Gaffin
*Assistant Examiner* — Li-Wu Chang
(74) *Attorney, Agent, or Firm* — Posz Law Group, PLC

(57) ABSTRACT

A computer-implemented system is provided for an analytic network process (ANP) control structure with feedback throughout the ANP control structure. The computer-implemented system includes an ANP control structure storage unit that stores an ANP control structure with feedback throughout the ANP control structure. Also included is a synthesizer that performs a BOCR calculation on the ANP control structure with feedback throughout the ANP control structure, to yield a result which is proper according to ANP theory when values are non-trivial. Also disclosed is a computer-implemented method for an analytic network process (ANP) control structure with feedback through the ANP control structure, and a related computer-readable storage medium encoded with a computer program.

25 Claims, 6 Drawing Sheets

U.S. PATENT DOCUMENTS

| | | | |
|---|---|---|---|
| 7,844,670 | B2 | 11/2010 | Roskowski et al. |
| 8,239,338 | B1 | 8/2012 | Adams et al. |
| 2001/0027455 | A1 | 10/2001 | Abulleil et al. |
| 2003/0069868 | A1 | 4/2003 | Vos |
| 2003/0191726 | A1 | 10/2003 | Kirshenbaum |
| 2003/0208514 | A1 | 11/2003 | Yang et al. |
| 2004/0103058 | A1* | 5/2004 | Hamilton .................. 705/38 |
| 2006/0195441 | A1 | 8/2006 | Julia et al. |
| 2006/0224530 | A1 | 10/2006 | Riggs et al. |
| 2006/0241950 | A1 | 10/2006 | Hansen et al. |
| 2008/0103880 | A1* | 5/2008 | Saaty ........................ 705/12 |
| 2008/0104058 | A1 | 5/2008 | Billmaier et al. |
| 2008/0250110 | A1 | 10/2008 | Zhao |
| 2008/0256054 | A1 | 10/2008 | Saaty |
| 2010/0318606 | A1 | 12/2010 | Sethi et al. |

FOREIGN PATENT DOCUMENTS

| | | |
|---|---|---|
| WO | WO 01/20530 | 3/2001 |
| WO | WO 2008/057178 | 5/2008 |
| WO | WO 2009/026589 A3 | 2/2009 |

OTHER PUBLICATIONS

Tuzkaya et al., "An analytic network process approach for locating undesirable facilities: An example from Istanbul, Turkey", Department of Industrial Engineering, Yildiz Technical University, Barbaros Street, Yildiz, Istanbul 34349, Turkey, Available online Jun. 28, 2007.

Adams et al., "Super Decisions Software Guide", Copyright c 1999/ 2003 Thomas L. Saaty (The software for the Analytic Network Process for decision making with dependence and feedback was developed by William Adams in 1999-2003).

Neaupane et al., "Analytic network process model for landslide hazard zonation", Civil Engineering Program, Sirindhorn Int. Ins. Of Technology, Thammasat University, Thailand, Available online May 2, 2008.

T.L. Saaty, "Rank from comparisons and from ratings in the analytic hierarchy/network processes", Katz Graduate School of Business, University of Pittsburgh, 322 Mervis Hall, Pittsburgh, PA 15260, USA, Available online Jun. 25, 2004.

R.W. Saaty, "Validation Examples for the Analytic Hierarchy Process and Analytic Network Process", MCDM 2004, Whistler, B. C. Canada Aug. 6-11, 2004.

Saaty, Thomas L., "The Analytic Hierarchy and Analytic Network Measurement Processes: Applications to Decisions under Risk", University of Pittsburgh, Pittsburgh, PA 15260, USA, 2008, pp. 75.

Office Action issued by the U.S. Patent Office on May 29, 2012 in connection with related U.S. Appl. No. 12/646,418.

Notice of Allowance issued by the U.S. Patent Office on Aug. 1, 2012 in connection with related U.S. Appl. No. 12/646,418.

Office Action issued by the U.S. Patent Office on Aug. 6, 2012 in connection with related U.S. Appl. No. 12/646,289.

Office Action issued by the U.S. Patent Office on Aug. 10, 2012 in connection with related U.S. Appl. No. 12/646,312.

U.S. Appl. No. 13/015,754, filed Jan. 28, 2011, Ryan Patrick Gay.

U.S. Appl. No. 13/290,423, filed Nov. 7, 2011, Adams.

U.S. Appl. No. 13/294,369, filed Nov. 11, 2011, Adams.

Wolfslehner, Bernhard, Vacik, Harald, Lexer, Manfred; "Application of the analytic network process in multi-criteria analysis of sustainable forest management", Forest Ecology and Management, Mar. 2005, pp. 157-170.

Office Action issued by the U.S. Patent Office on Mar. 15, 2012 in connection with related U.S. Appl. No. 12/646,099.

Notice of Allowance issued by the U.S. Patent Office on Apr. 17, 2012 in connection with related U.S. Appl. No. 12/646,099.

U.S. Appl. No. 12/646,099, filed Dec. 23, 2009, Adams.

U.S. Appl. No. 12/646,289, filed Dec. 23, 2009, Adams.

U.S. Appl. No. 12/646,312, filed Dec. 23, 2009, Adams.

U.S. Appl. No. 12/646,418, filed Dec. 23, 2009, Adams.

Office Action issued by the U.S. Patent Office on Aug. 5, 2008 in connection with related U.S. Appl. No. 11/586,557.

Office Action issued by the U.S. Patent Office on Apr. 14, 2009 in connection with related U.S. Appl. No. 11/586,557.

Office Action issued by the U.S. Patent Office on Apr. 13, 2009 in connection with related U.S. Appl. No. 11/783,436.

Office Action issued by the U.S. Patent Office on Oct. 21, 2009 in connection with related U.S. Appl. No. 11/783,436.

Notification of Transmittal of the International Search Report and the Written Opinion of the International Searching Authority mailed Aug. 25, 2008 in corresponding PCT application No. PCT/US2007/ 022184.

Notification of Transmittal of the International Preliminary Report on Patentability mailed May 7, 2009 in corresponding PCT application No. PCT/US2007/022184.

Super Decisions Software for Decision Making, Super Decisions Website, (http://web.archive.org/web/20041202040911/http://www.superdecisions.com/ and http://www.superdecisions.com/~saaty/), 2004.

The Super Decisions Software, The Essentials of the Analytic Network Process with Seven Examples, Decision Making with Dependence and Feedback, (http://www.superdecisions.com/~saaty/Fall2005DecisionClass/PowerpointSlides/), Sep. 2005.

The Super Decisions Software, The Analytic Network Process for Decision Making with Dependence and Feedback lecture 2, Tutorial ANP BOCR (http://www.superdecisions/~saaty/Fall2005DecisionClass/PowerpointSlides/) Sep. 2005.

Decision Lens Inc., Decision Lens's Decision Lens Suite™ Product, (http://web.archive.org/web/20050204181100/www.decisionlens.com/index.php), 2004-2005.

Caterinicchia, Dan, "A problem-solving machine," *Federal Computer Week*, (Sep. 4, 2000), 14, 31, p. 48-49.

The Super Decisions Software, The Analytic Network Process, Decision Making with Dependence and Feedback, (http://www.superdecisions.com/~saaty/Fall2005DecisionClass/PowerpointSlides/), Sep. 2005.

Mikhailov et al., "Fuzzy Analytic Network Process and its Application to the Development of Decision Support Systems," IEEE Transactions on Systems, Man, and Cybernetics—Part C: Applications and Reviews, (Feb. 2003), vol. 33, No. 1, p. 33-41.

Decision Lens, Inc., Tutorial on Hierarchical Decision Models (AHP), 2002.

Decision Lens, Inc., Tutorial on Complex Decision Models (ANP), 2002.

Rozann W. Saaty., Decision Making in Complex Environments: The Analytic Network Process (ANP) for Dependence and Feedback Including a Tutorial for the SuperDecisions Software and Portions of the Encyclicon of Application, Dec. 2002.

Rozann W. Saaty., Decision Making in Complex Environments: The Analytic Network Process (ANP) for Dependence and Feedback Including a Tutorial for the SuperDecisions Software and Portions of the Encyclicon of Application, 2005.

Decision Lens, Inc., *MS_Help_Decision_Lens*. "Welcome to Decision Lens Software™," Jun. 6, 2005.

Team Acuity, SAGD ANP Enhancement Functional Requirements Document, (Dec. 15, 2007), p. 1-68.

Decision Lens, Inc., *DLW_Help File*, Dec. 2007.

Decision Lens, Inc., *DLS_Help File*, Dec. 2007.

H. Sun., "AHP in China," International Symposium on the Analytic Hierarchy Process, (Jul. 8-10, 2003), p. 1-21.

Thomas L. Saaty., "Decision-Making with the AHP: Why is the Principal Eigenvector Necessary," International Symposium on the Analytic Hierarchy Process, (Aug. 2-4, 2001), p. 1-14.

Thomas L. Saaty., "The Analytic Network Process: Dependence and Feedback in Decision Making (Part 1) Theory and Validation Examples," International Symposium on the Analytic Hierarchy Process, (Aug. 6-11, 2004), p. 1-10.

Davolt, Steve, "The man who knew too much," *Washington Business Journal*, (Aug. 7, 2007), (http://www.bizjournals.com/washington/stories/2000/08/07/smallb1.html?t=printable).

Roxann Saaty et al., "Decision Making in complex environments," Super Decisions, 2003.

Feglar et al., "Dynamic Analytic Network Process: Improving Decision Support for Information and Communication Technology," ISAHP, Honolulu, Hawaii, (Jul. 8-10, 2003).

Borenstein et al., "A Multi-Criteria Model for the Justification of IT Investments," (Feb. 2005), INFOR v3n1, Canadian Operational Research Society, p. 1-21.

Liming Zhu, et al., "Tradeoff and Sensitivity Analysis in Software Architecture Evaluation Using Analytic Hierarchy Process," *Software Quality Journal*, (2005), vol. 13, p. 357-375.

Condon et al., "Visualizing group decisions in the analytic hierarchy process," *Computers & Operation Research*, (2003), 30, p. 1435-1445.

D. Saaty et al., "The Future of University of Pittsburgh Medical Center: Strategic Planning with the Analytic Network Process," Proceedings of the Fourth International Symposium on the Analytic Hierarchy Process, (Jul. 12-15, 1996), p. 107-121.

* cited by examiner

METHOD AND SYSTEM FOR CONNECTING ANALYTIC NETWORK PROCESS MODEL (ANP) WITH FEEDBACK THROUGHOUT THE ANP MODEL BETWEEN SUB-NETWORKS

TECHNICAL FIELD

The present invention relates in general to an analytic network process (ANP) model, and more specifically to an improved structure and/or view of an analytic network process model.

BACKGROUND

A traditional analytic network process (ANP) model consists of two main pieces of information: a control tree, and a collection of networks attached to nodes in the tree. The networks attached to nodes in the control tree consist of nodes grouped together in clusters. In the network, nodes may be directionally connected to each other, and clusters may also be directionally connected to each other. The connections between nodes (and clusters) indicate that one must have a priority for the destination with respect to the source. This process serves to break down large decisions into smaller, manageable decisions. In order to conduct a decision-making process, one typically utilizes a controlling tree to organize and separate logically disconnected networks, while allowing for inter-relationships.

In performing an assessment using a traditional ANP model, the following steps are performed: (1) construct the ANP model; (2) pairwise compare each two clusters (also referred to as sub-networks) or nodes based on their interrelations; (3) perform a supermatrix calculation based on results from the paired comparisons; (4) perform limit calculation; (5) do ratings calculations; and (6) finally perform a final assessment (BOCR calculation) based on the supermatrix calculation result analysis.

The supermatrix calculation aims to form a synthesized supermatrix to allow for resolution based on the effects of the interdependencies that exist between the elements of the ANP model. An unweighted supermatrix is initially constructed, as is well known. Then, a weighted supermatrix is transformed by multiplying all nodes in a cluster of the initial supermatrix by the weight of the cluster, which was established by pairwise comparison among cluster. Finally, a limiting supermatrix is composed.

The ANP model does not allow for feedback connections between sub-networks within the ANP model because sub-networks are conventionally connected to nodes. The limitations of connecting fi-om node to sub-network include that there can only ever be a control hierarchy (really only a tree is possible with this mechanism).

Furthermore, the structure of how things interact in a traditional ANP model is not clear. When a user looks at Benefits, for example, the user cannot see data in the so-called alternatives, which (according to the traditional ANP model) are down at the lowest level in the network.

According to traditional ANP theory, there cannot be feedback in the ANP control structure because only trees are permitted.

SUMMARY

Accordingly, one or more embodiments of the present invention provide a computer-implemented system for an analytic network process (ANP) control structure with feedback throughout the ANP control structure. The system includes an ANP control structure storage unit that stores an ANP control structure with feedback throughout the ANP control structure; and a synthesizer that performs a BOCR calculation on the ANP control structure with feedback throughout the ANP control structure, to yield a result which is proper according to ANP theory when values are non-trivial.

In at least one embodiment, the stored ANP control structure is configured to include subnetworks according to ANP theory, one of the subnetworks being attached to a node-to-cluster connection in the ANP control structure stored in the ANP control structure storage unit instead of being attached to the node itself.

At least one embodiment includes an output unit configured to output, for simultaneous display to a user, more than two contiguous levels of the ANP control structure with feedback between said more than two contiguous levels. Some embodiments include an output unit configured to output, for a display to a user, a result of the ANP calculations on the ANP control structure with feedback.

In at least one embodiment, the non-trivial values when the result is proper being when (i) non-zero ANP alternatives of invert and add, or positives minus negatives, are under costs or risks in the ANP control structure using a subtraction formula, or (ii) non-0.5 ANP alternatives are under costs or risks in the ANP control structure using a probabilistic formula.

Some embodiments include an input unit configured to input, from an input device, pairwise comparisons, ANP ratings, or ANP client data, which are transformed into priority vectors and stored into the ANP control structure representing, the pairwise comparisons representing a user's judgment of priority between the ANP alternatives in the pair, the ANP ratings representing a user's rating of a choice, and the ANP client data representing real world values.

There is also provided a computer-implemented method for an analytic network process (ANP) control structure with feedback throughout the ANP control structure. The method can include storing, in an ANP control structure storage unit, an ANP control structure with feedback throughout the ANP control structure. The method can also include performing, in a synthesizer of a computer processor, a BOCR calculation on the ANP control structure with feedback throughout the ANP control structure, to yield a result which is proper according to ANP theory when values are non-trivial In some embodiments, the method can also include outputting, from an output unit, for a display to a user, more than two contiguous levels of the ANP control structure with feedback between said more than two contiguous levels. In some embodiments, the method includes outputting, from an output unit, for a display to a user, a result of the ANP calculations on the ANP control structure with feedback.

In at least one embodiment, the method includes inputting, from an input device, pairwise comparisons, ANP ratings, or ANP client data, which are transformed into priority vectors and stored into the ANP control structure representing, the pairwise comparisons representing a user's judgment of priority between the ANP alternatives in the pair, the ANP ratings representing a user's rating of a choice, and the ANP client data representing real world values.

At least one embodiment provides an apparatus configured to perform the method embodiment(s).

An embodiment can include one or a combination of more than one of the embodiments discussed herein.

There is also provided a computer-readable storage medium encoded with a computer program for an analytic network process (ANP) control structure with feedback throughout the ANP control structure. The execution of the computer program by one or more processors causes the one or more processors to perform steps. The steps include storing, in an ANP control structure storage unit, an ANP control structure with feedback throughout the ANP control structure; and performing, in a synthesizer, a BOCR calculation on the ANP control structure with feedback throughout the ANP control structure, to yield a result which is proper according to ANP theory when values are non-trivial.

An embodiment can include instructions for outputting, from an output unit, for a display to a user, more than two contiguous levels of the ANP control structure with feedback between said more than two contiguous levels. Another embodiments can include instructions for outputting, from an output unit, for a display to a user, a result of the ANP calculations on the ANP control structure with feedback.

Yet another embodiment can include instructions for inputting, from an input device, pairwise comparisons, ANP ratings, or ANP client data, which are transformed into priority vectors and stored into the ANP control structure representing, the pairwise comparisons representing a user's judgment of priority between the ANP alternatives in the pair, the ANP ratings representing a user's rating of a choice, and the ANP client data representing real world values.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the present invention.

DETAILED DESCRIPTION

Figure 1:
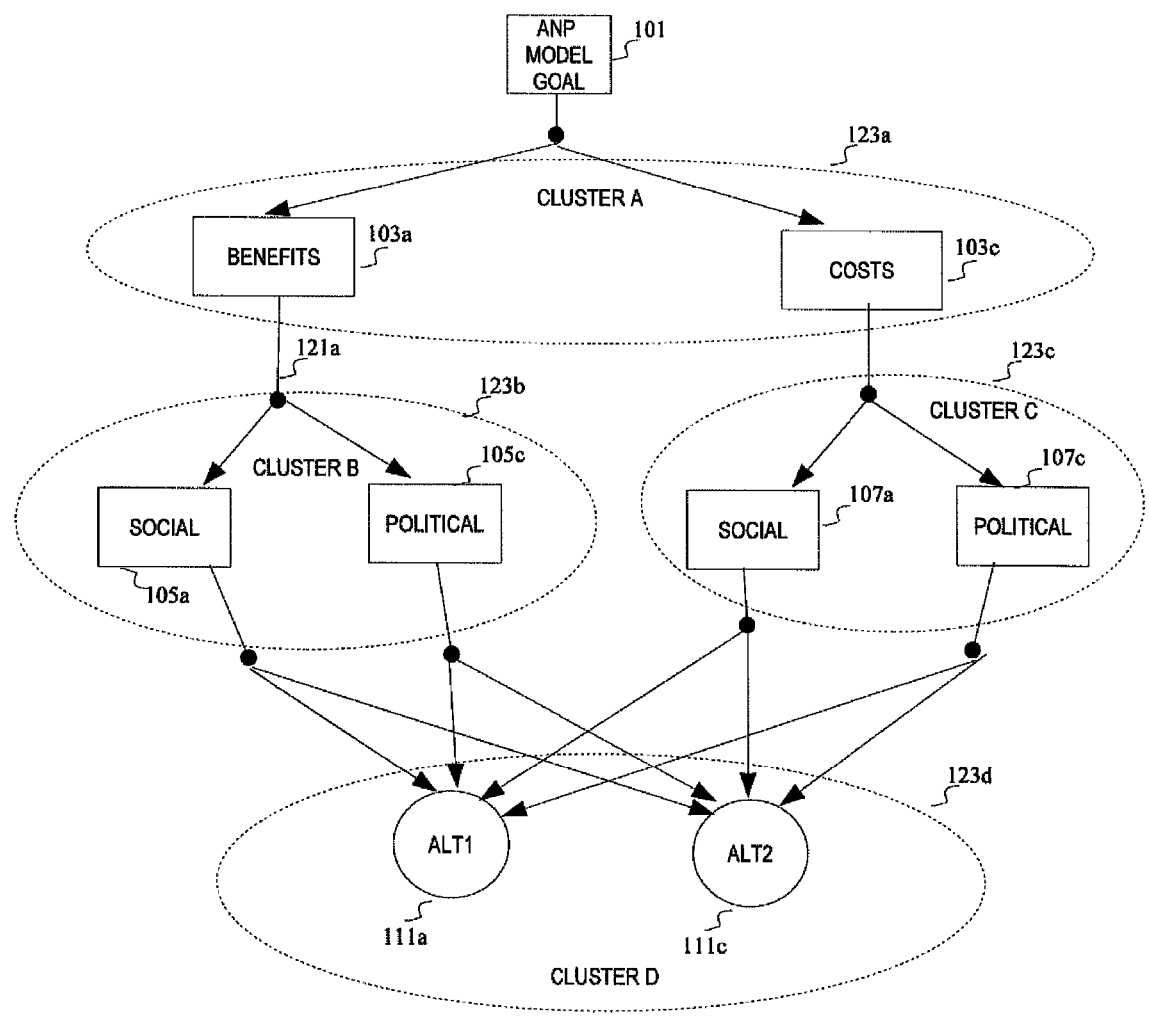
FIG. 1 is a diagram illustrating a top level network of a simplified and representative analytic network process (ANP) control structure with subnetworks attached to connections of the ANP control structure.

In overview, the present disclosure concerns computers, computer networks and computer systems, such as an intranet, local area network, distributed network, or the like having a capability of analyzing variables in decision models. Such computer networks and computer systems may further provide services such as interacting with users, and/or evaluating modifications to a decision model. More particularly, various inventive concepts and principles are embodied in systems, devices, and methods therein related to multiple-level evaluations of an analytic network process model control structure with feedback between sub-networks of the model. It should be noted that the term device may be used interchangeably herein with computer, wireless communication unit, or the like. Examples of such devices include personal computers, general purpose computers, personal digital assistants, cellular handsets, and equivalents thereof.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to connect to connections and thereby enabling feedback between sub-networks. This can create a more integrated multi-network structure, providing for both macro analysis and micro analysis.

The conventional structure in the ANP model such as available from SuperDecisions lacks flexibility in how the ANP model is adapted as the decision model is adapted. Consider a conventional SuperDecisions ANP model with Political, Social, and Economic sub-networks, under the benefits and costs subnetworks. If the user decides to pairwise compare benefits and costs with respect to political, that cannot be done; there is no way to connect political back to benefits and/or costs in the conventional ANP model.

Further in accordance with exemplary embodiments, there is provided an ANP model with sub-networks connecting to the connection from benefits to political, social and economic (instead of connecting to the node as in conventional ANP models). Thus, the user can pairwise compare throughout the political, social and economic with respect to a criterion in the network, throughout the entire ANP model.

Figure 6:
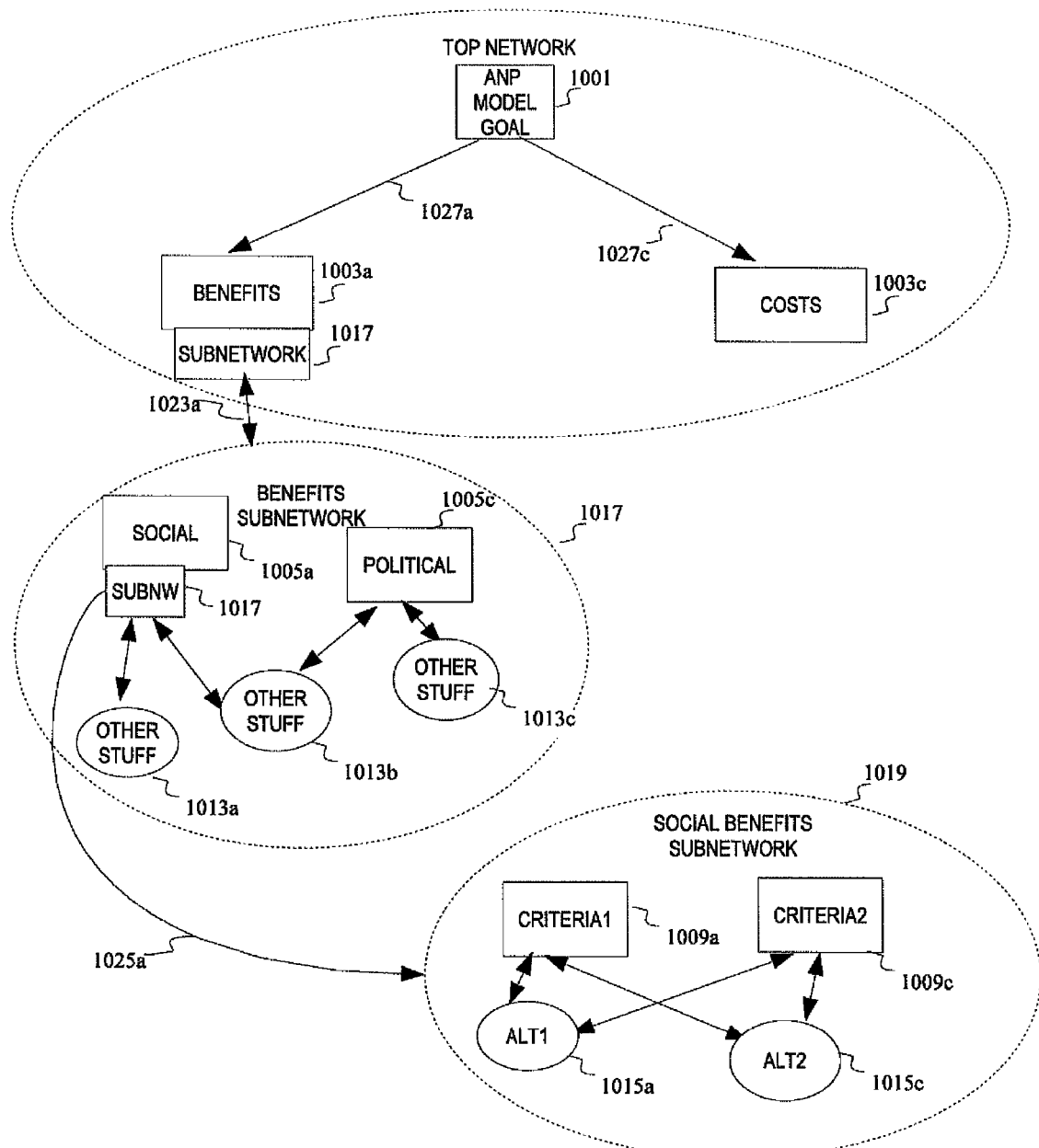
FIG. 6 is an illustration of a prior art ANP control structure.

In the ANP model, there are conventionally provided control criteria that are benefits, costs, opportunities, and risks (commonly abbreviated BOCR). Referring now to FIG. 6, an illustration of a prior art ANP control structure will be discussed and described. The illustration is simplified for ease of discussion. At the top of the conventional ANP network, a user has a view of the ANP model goal 1001, benefits 1003*a* and costs 1003*c*, (Opportunities and risks are not shown.) The benefits 1003*a* is a node that includes a subnetwork 1017. The subnetwork 1017 includes a one way directional link from the benefits 1003*a* node to the subnetwork which is specific to the benefits 1003*a* node, that is, the benefits subnetwork 1017. The other nodes at this level such as the costs 1003*c* node also have their own subnetworks (not illustrated).

The benefits subnetwork 1017 includes the alternatives, in this example, social (which is the social benefits node 1005*a*) and political (which is the political benefits node 1005*c*). The social benefits node 1005*a* includes a one-way directional connection to the subnetwork that is specific to the social benefits node 1005*a*, that is, the social benefits subnetwork 1019. The other nodes at this level such as the political benefits 1005*c* node also have their own subnetworks (not illustrated).

In a conventional ANP network model, the connection, such as from the social benefits node 1005*a* to the subnetwork, exists to insert priorities. The connection defines how important the destination node is to the source. Hence, a connection is directional, that is, it has a from direction and a to direction. For example, a connection from the conventional ANP model goal 1001 to the costs 1003*c* means that the user must define how important costs are to the goal. In the conventional ANP model, the user does not define the reverse, i.e., how important the goal is to the cost.

The social benefits subnetwork 1019 includes criteria represented by criteria 1 1009*a* and criteria 2 1009*c*, which are illustrative of any number of pre-defined criteria which can be pre-defined when the ANP control structure is set up. The criteria are linked to the alternatives, here represented by alternative 1 1015*a* and alternative 2 1015*c*.

Now only three levels deep in the conventional ANP model illustrated in FIG. 6 can a user finally see any indication of what the "real alternatives" are, i.e., alternative 1 and alternative 2 1015*a*, 1015*c*, which are merely representations of pre-defined alternatives, which can be pre-defined when the ANP control structure is set up. That is, the user traverses the ANP model control structure from the goal (top of the ANP network), through the benefits subnetwork 1017, and finally through one of the bottom level subnetworks, e.g., social benefits subnetwork 1019 to see that the user is comparing alternative 1 and alternative 2 1015*a*, 1015*c*.

Also notice that the user has a view of the subnetworks that is limited to the items within a cluster of the control tree. That is, the user can see that the goal is evaluated against benefits, opportunities, costs and risks, and that benefits are evaluated against social and political, and that social benefits are evaluated against the alternatives.

Part of the problem with traditional ANP models such as illustrated in FIG. 6 is that subnetworks are calculationally attached to the nodes, e.g., the benefits subnetwork 1017 is calculationally attached to the benefits note 1003*a*. Also, since the nodes are directionally linked, the BOCR calculations, especially benefits and costs calculations, are limited since some calculations (if forced within the framework of existing ANP theory) are incomplete, and will (in all but a few degenerate cases) obtain incorrect results.

In the embodiment discussed below, however, feedback can be permitted with BOCR for all of the sub-networks.

Referring now to FIG. 1, a diagram illustrating a top level network of a simplified and representative analytic network process (ANP) control structure with subnetworks attached to connections of the ANP control structure will be discussed and described. For simplicity of discussion, the illustrated ANP control structure omits opportunities and risks but includes benefits and costs; and has just two example control subcriteria (social and political) under both benefits and costs.

The illustrated ANP model includes an ANP model goal 101, benefits 103*a*, costs 103*c*; cluster A 123*a* with benefits 103*a* and costs 1003*c*, cluster B 123*b* with social benefits 105*a* and political benefits 105*c*; cluster C 123*c* with social costs 107*a* and political costs 107*c*; and cluster D 123*d* with alternative 1 111*a* and alternative 2 111*c*. (Opportunities and risks are not shown.)

The benefits node 103*a* includes a connection from the benefits 103*a* node to the social benefits and political benefits nodes 105*a*, 105*b* in the subnetwork which is specific to the benefits node 103*a*, that is, the benefits subnetwork. More particularly, the benefits subnetwork is attached to the connection; the connection indicates how influence feeds through the subnetwork. Because the subnetwork is attached to the connection (instead of to the node), calculations can be performed on the connection, in contrast to the conventional ANP model where calculations are performed on the nodes.

Similarly, the costs node 103*c* includes a connection from the costs node 103*c* to the social costs node 107*a* and political costs node 107*c* in the subnetwork which is specific to the costs node 103*c*, that is, the costs subnetwork. The costs subnetwork is attached to the connection; the connection indicates how influence feeds through the network.

Cluster D is the alternatives cluster and includes the alternatives, in this illustration, alternative one 111*a* and alternative two 111*c*, which are illustrative of any number of pre-defined alternatives which can be pre-defined when the ANP control structure is set up. The social benefits node 105*a* has a connection extending from it to the alternatives cluster. Also, the political benefits node 105*c* has a connection extending from it to the alternatives cluster. Similarly, the social costs node 107*a* and political costs node 107*c* each has a connection extending from the node to the alternatives cluster. The alternatives 111*a*, 111*b* are each individually attached to each of the connections extending from the nodes in the next higher cluster, in this example, the social benefits node 105*a*, political benefits node 105*c*, social costs node 107*a*, and political costs node 107*c*.

The user thus can have an overview of the entire network illustrated in FIG. 1 because the subnetworks are attached to the connections from the next higher nodes instead of being connected to next higher nodes themselves. Thus, a user can see the alternatives (here, alternative one and alternative two 111*a*, 111*c*) as well as multiple or even all other levels of the ANP model such as the ANP model goal 101, the benefits node 103*a*, the costs node 103*c*, the social benefits node 105*a*, the political benefits node 105*c*, the social costs node 107*a*, and/or the political costs node 107*c*.

Figure 2:
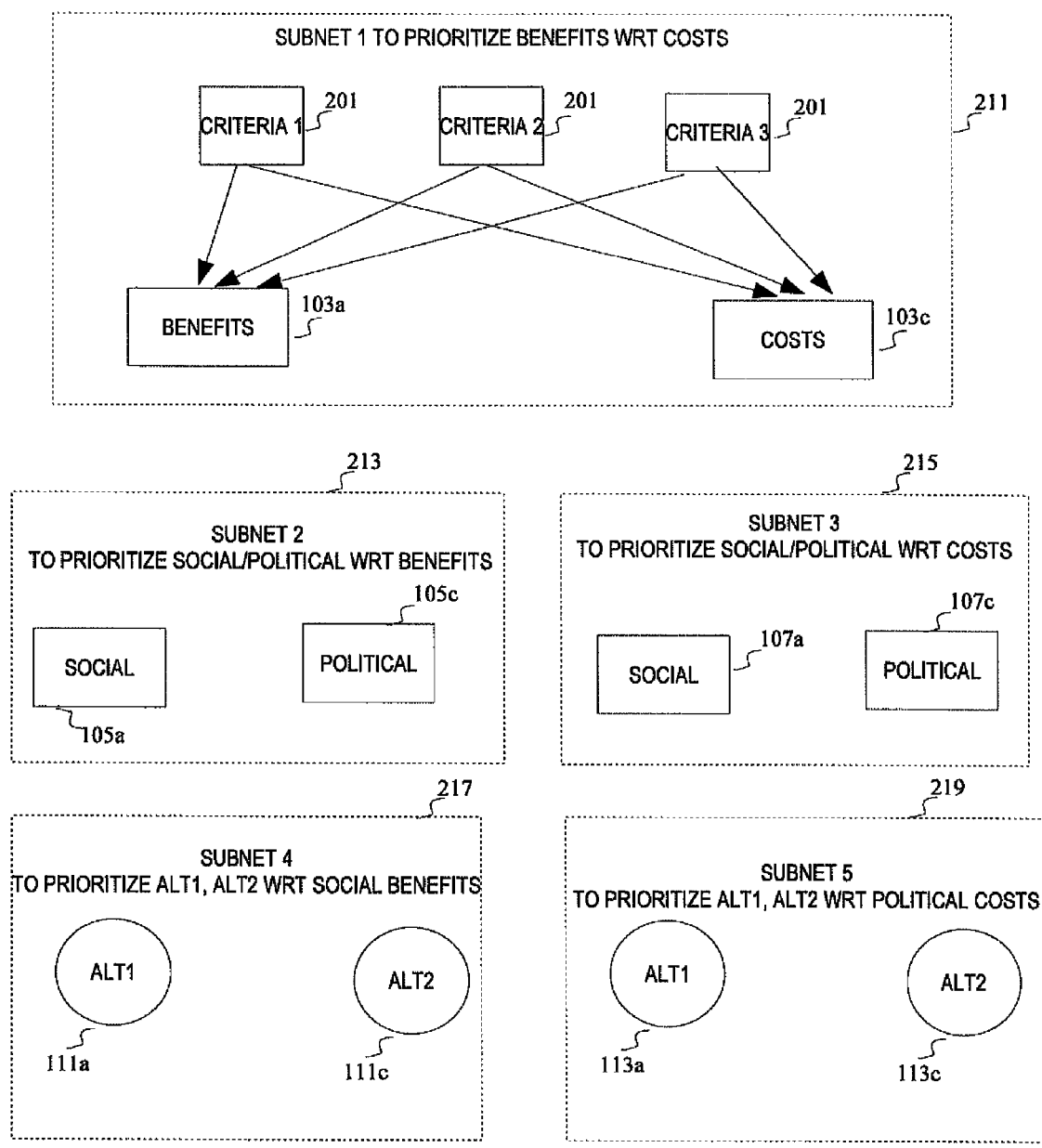
FIG. 2 is a diagram illustrating representative subnetworks of FIG. 1.

Referring now to FIG. 2, a diagram illustrating representative subnetworks of FIG. 1 will be discussed and described. FIG. 2 illustrates subnetworks one 211, two 213, three 215, four 217 and five 219. Subnetwork one includes criteria one 201, criteria two 201, criteria three 201, benefits 103*a* and costs 103*c*. Subnetwork two includes social 105*a* and political 105*c*. Subnetwork three includes social 107*a* and political 107*c*. Subnetwork four includes alternative one 111*a* and alternative two 111*c*. Subnetwork five includes alternative one 113*a* and alternative two 113*c*.

Subnetwork one 211 is a network that leads to a prioritization of benefits and costs with respect to the goal. Subnetwork two 213 is a network that leads to a prioritization of social and political with respect to benefits. Subnetwork three 215 is a network that leads to a prioritization of social and political with respect to costs. Subnetwork four 217 is a network that leads to a prioritization of alternative one and alternative two 111a, 111c with respect to social benefits. Subnetwork five 219 is a network that leads to a prioritization of alternative one and alternative two 113a, 113c with respect to political costs. The prioritizations can be stored as prioritizers (discussed in more detail below).

Figure 3:
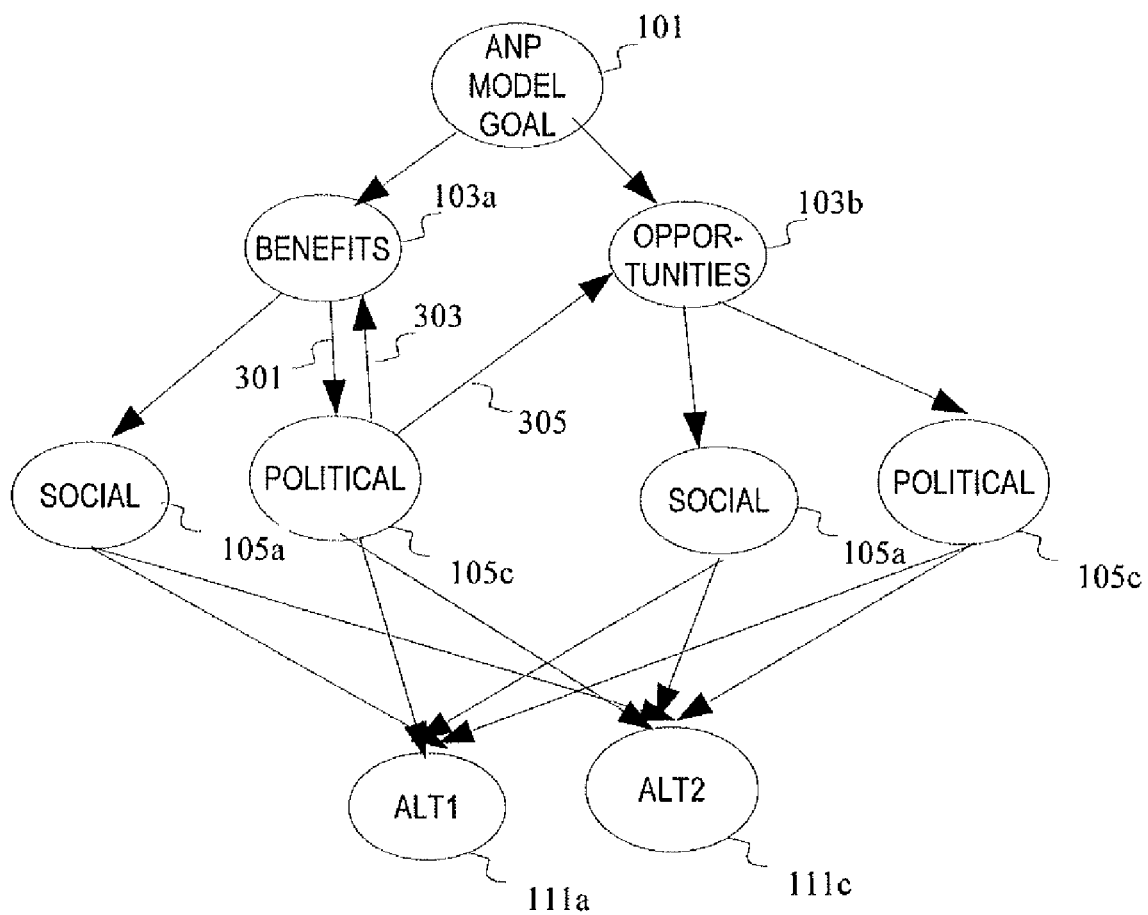
FIG. 3 is a diagram illustrating a simplified representation of an ANP control structure with linking throughout.

Referring now to FIG. 3, a diagram illustrating a simplified representation of an ANP control structure with linking throughout will be discussed and described. By way of background, in a conventional ANP control structure, the weight cycles, so it is very difficult to represent multiple levels. The individual ANP subnetworks need to be independent. Because the subnetworks are independent, there is no feedback up the tree and to sibling subnetworks. The conventional ANP control structure network cannot perform a proper BOCR calculation because traditional ANP theory relies solely on matrix multiplication to calculate limiting priorities. Therefore, there was a need for a feature to perform a BOCR calculation on a combination of plural levels.

In the illustrated ANP control structure with linking throughout, the criteria can use benefits, opportunities, costs and/or risks not only as conventional BOCR but also as "alternatives" with respect to a destination node. Note that a multi-threaded tree would be inadequate since conventional BOCR calculations would be incorrect. Specifically, conventional ANP theory (and hence conventional BOCR calculations) calls for matrix multiplication of supermatrices. Certain matrix multiplication operations over a simple combination of sub-networks will be incorrect, such as matrix operations of inverting and adding, or subtracting.

The ANP control structure illustrated in FIG. 3 is a different representation of the ANP control structure of FIG. 1 and re-uses reference numbers as described above. In the ANP control structure, there is a directional connection 301 not only from the benefits node 103a to the political benefits node 105c, but also a directional connection 303 from the political benefits node 105c to the benefits node 103a. Also, in this example there is a directional connection 305 from the political benefits node 105c to the opportunities node 103b. Accordingly, the question can be asked: with respect to political, which is more important, benefits or opportunities? That is, the ANP control structure which supports linking from a node in a lower-level subnetwork to a node in a higher-level subnetwork and/or in a non-sibling network allows prioritizations to be made which cannot be made in a traditional ANP control structure by associating a prioritizer with the reverse directional connection 303, 305. As explained herein, support for the calculations can be provided by also associating a synthesizer (discussed in more detail below) with the connection between a node and its cluster subnetwork, so that the BOCR calculations yield a result which is proper.

Figure 4:
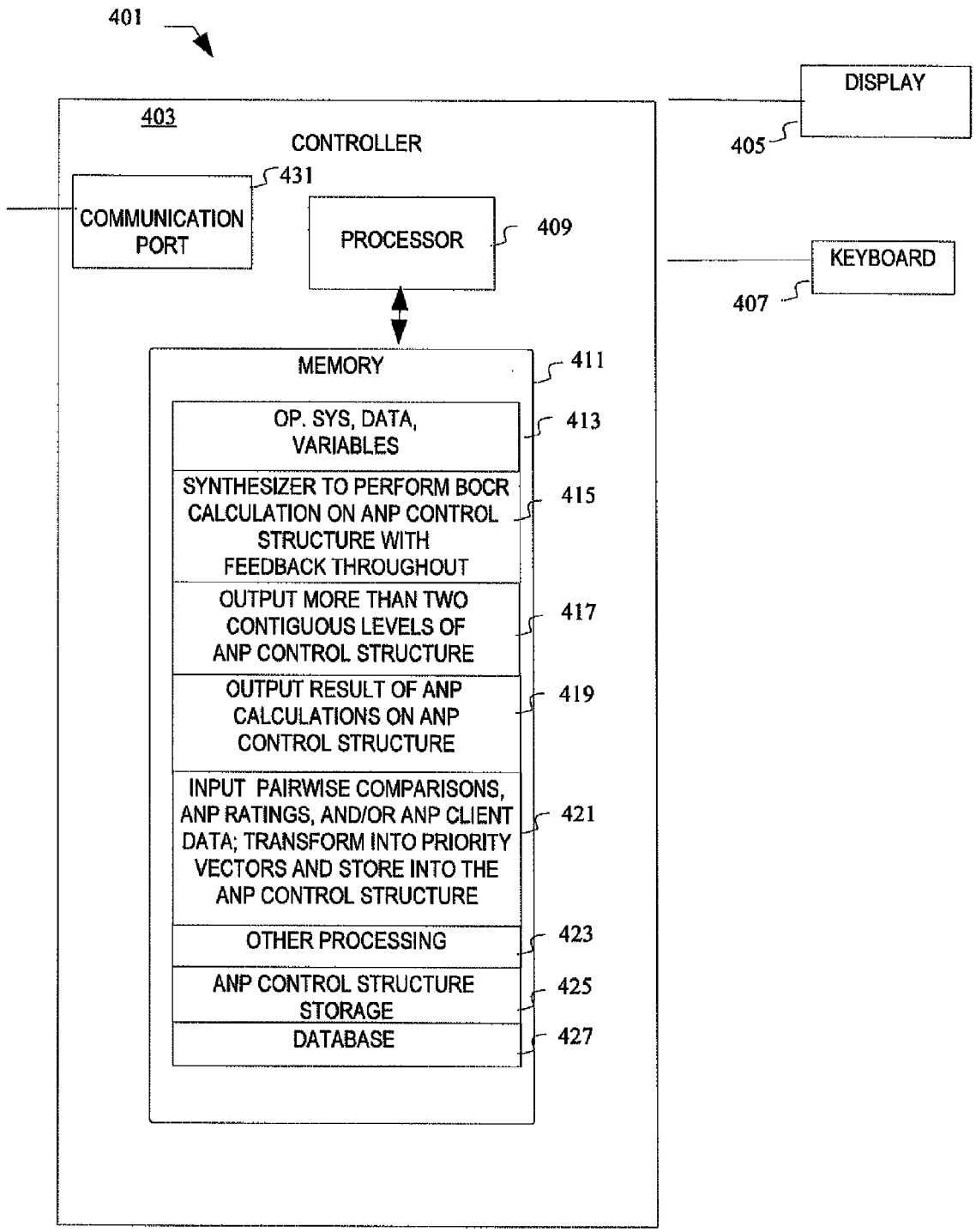
FIG. 4 is a block diagram illustrating portions of an exemplary computer.

Referring now to FIG. 4, a block diagram illustrating portions of an exemplary computer will be discussed and described. FIG. 4 is a block diagram of an exemplary computer 401 for use in operation of one or more embodiments. The computer 401 may include a communication port 431 for communication with an external device (not illustrated), a processor 409, a memory 411, a display 405, and/or a user input device 407, e.g., a keyboard (as illustrated). Many of the other elements of a computer are omitted but will be well understood to one of skill in the art.

The processor 409 may comprise one or more microprocessors and/or one or more digital signal processors. The memory 411 may be coupled to the processor 409 and may comprise a read-only memory (ROM), a random-access memory (RAM), a programmable ROM (PROM), and/or an electrically erasable read-only memory (EEPROM). The memory 411 may include multiple memory locations for storing, among other things, an operating system, data and variables 413 for programs executed by the processor 409; computer programs for causing the processor to operate in connection with various functions such as a synthesizer 415 to perform BOCR (benefits, opportunities, costs, risks) calculation on an ANP control structure with feedback throughout; to output 417 more than two contiguous levels of ANP control structure; to output 419 a result of the ANP calculations on the ANP control structure; to input 421 pairwise comparisons, ANP ratings, and/or ANP client data, and transform the data into priority vectors and store into the ANP control structure; and/or other processing 423; an ANP control structure storage 425 in which the ANP control structure is stored; and a database 427 for other information used by the processor 409. The computer programs may be stored, for example, in ROM or PROM and may direct the processor 409 in controlling the operation of the computer 401.

The user may invoke functions accessible through the user input device 407. The user input device 407 may comprise one or more of various known input devices, such as a keypad, a computer mouse, a touchpad, a touch screen, a trackball, and/or a keyboard. Responsive to signaling from the user input device 407, in accordance with instructions stored in memory 411, or automatically upon receipt of certain information via the communication port 431, the processor 409 may direct the stored information or received information to be processed by the instructions stored in memory 411.

The display 405 may present information to the user by way of a text and/or image display 405 upon which information may be displayed. The display 405 may present information to the user by way of a conventional liquid crystal display (LCD) or other visual display, and/or by way of a conventional audible device (such as a speaker, not illustrated) for playing out audible messages.

In performing an assessment using a ANP v2 model, the following functions can be performed by, e.g., computer programs: (1) interact with a user to construct the ANP v2 model, and store the ANP v2 model in, e.g., ANP control structure storage; (2) then, pairwise compare, or rate, etc., each two clusters or nodes based on their interrelations; (3) then, perform an ANP v2 supermatrix calculation based on results from the paired comparisons; and (4) finally perform an ANP v2 limit calculation (discussed in greater detail below), which integrates the BOCR calculation. In creating the supermatrix, the ratings are handled as part of the supermatrix process. The following illustrated functions are discussed in more detail.

The processor 409 can be programmed with a synthesizer 415 that performs a BOCR (benefits, opportunities, costs, risks) calculation on an ANP control structure with feedback throughout the ANP control structure. Already, the ANP model has been constructed and sub-networks; nodes within the ANP model have been pairwise compared based on their interrelations; and the supermatrix has been constructed substantially along the lines of conventional ANP model theory (although the ANP model structure discussed herein is different). The ANP control structure, which may be stored for example in the ANP control structure storage 425 or in another appropriate memory, is used for a BOCR calculation on the superinatrix. The BOCR calculation is discussed in more detail below.

One or more different synthesizers can be specified separately for each node-to-cluster connection (and also for cluster-to-cluster connections, thereby eliminating the weighted supermatrix step), so that a synthesizer is specified on each connection. The synthesizer is a pre-determined formula which is used for the node-to-cluster connection and the values specified by a prioritizer on each of the node-to-cluster connection. The prioritizer on a particular node-to-cluster connection specifies the source of the values used by the synthesizer, and hence fills in the values for the synthesizer. Also, the synthesizer and/or prioritizer can be specified where the node-to-cluster connection is backwards (i.e., from a node to a higher-level cluster). The prioritizer performs consistent BOCR calculations even when the node-to-cluster connection is backwards.

The processor 409 is programmed to output 417 more than two contiguous levels of ANP control structure. That is, the processor 409 can output, for simultaneous display to a user, more than two contiguous levels of the ANP control structure with feedback between the displayed contiguous levels. The user can then interact with the computer, e.g., via the keyboard 407 and display 405, to manipulate values of the levels of the ANP control structure which are displayed, and the ANP control structure can not only insert the values but also operate the synthesizer 415 on the values so that a proper result is provided for the more than two contiguous levels which are displayed.

The processor 409 is programmed to output 419 a result of the ANP calculations on the ANP control structure with feedback. At this point, the BOCR calculation has been performed on the ANP v2 control structure. The result can be output to, for example, the display, or can be output for further manipulation. The result is used to determine which of the alternatives is preferable based on the input, discussed below.

The processor 409 is programmed to input 421 pairwise comparisons, ANP ratings, and/or ANP client data, and transform the data into priority vectors and store into the ANP control structure. As with traditional ANP, alterniatives can be pairwise compared. The ANP v2 also provides that alternatives can be rated, data input into the alternatives, or the like. The data which is input can be transformed into priority vectors, as with traditional ANP, and any matrix transformations can be prepared. The result can be stored into the ANP control structure, such as an ANP control structure storage 425 in the memory 411.

Optionally, other components may be incorporated in the computer 401 to produce other actions. For example, a user can interface with the computer 401, via a known user interface such as OUTLOOK software, WINDOWS software, and/or other commercially available interfaces. Further, the computer 401 can send and receive transmissions via known networking applications operating with the communication port 431 connected to a network, for example, a local area network, intranet, or the Internet and support software.

It should be understood that various embodiments are described herein in connection with logical groupings of programming of functions. One or more embodiments may omit one or more of these logical groupings. Likewise, in one or more embodiments, functions may be grouped differently, combined, or augmented. For example, in one or more embodiments, the synthesizer can be omitted. In addition, some of these functions may be performed predominantly or entirely on one or more remote computers (not illustrated); and therefore such functions can be reduced or omitted from the processor 409 and distributed to the remote computer. Similarly, the present description may describe various databases or collections of data and information. One or more embodiments can provide that databases or collections of data and information can be distributed, combined, or augmented, or provided locally (as illustrated) and/or remotely (not illustrated).

The computer 401 can include one or more of the following, not illustrated: a floppy disk drive, an optical drive, a hard disk drive, a removable USB drive, and/or a CD ROM or digital video/versatile disk, which can be internal or external. The number and type of drives can vary, as is typical with different configurations, and may be omitted. Instructions for operating the processor 409 can be provided electronically, for example, from the drive, via the communication port 431, or via the memory 411.

Figure 5:
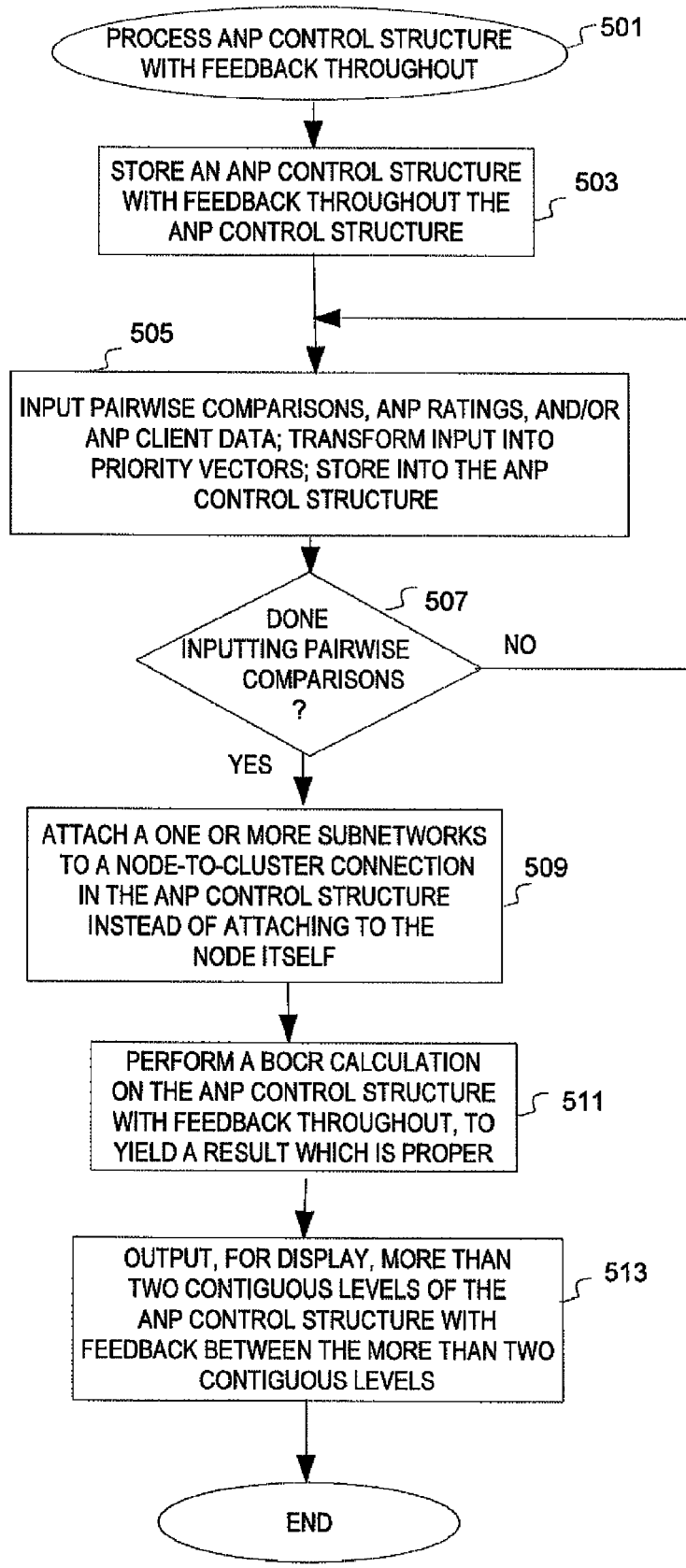
FIG. 5 is a flow chart illustrating an exemplary procedure to process an ANP control structure with feedback throughout.

Referring now to FIG. 5, a flow chart illustrating an exemplary procedure to process an ANP control structure with feedback throughout will be discussed and described. The procedure can advantageously be implemented on, for example, a processor of a controller, described in connection with FIG. 4 or other apparatus appropriately arranged.

In overview, the illustrated process includes storing 503 an ANP control structure with feedback throughout the ANP control structure; inputting 505 pairwise comparisons, ANP ratings, and/or ANP client data, transforming the input into priority vectors, and storing the input and priority vectors into the ANP control structure. The process loops to input 505 pairwise comparisons, etc., until done 507 inputting pairwise comparisons or other input. When done inputting the pairwise comparisons or other input, the process attaches 509 a subnetwork to a node-to-cluster connection in the ANP control structure instead of attaching to the node itself; performs 511 a BOCR calculation on the ANP control structure with feedback throughout, to yield a result which is proper; and outputs 513, for display, more than two contiguous levels of the ANP control structure with feedback between the more than two contiguous levels. Each of these is described in more detail below, to the extent not previous detailed.

The process 501 can store 503 an ANP control structure with feedback throughout the ANP control structure. Initially, the ANP control structure includes pre-defined alternatives and criteria, but does not have values assigned to the relative importance of the alternatives and criteria. As the values are added, modified, or deleted, the ANP control structure with the added, modified, or deleted values can be stored.

The process 501 can input 505 pairwise comparisons, ANP ratings, and/or ANP client data. The user interface side of inputting pairwise comparisons, ratings, or client data can be performed according to known techniques. For example, the process 501 can query the user to input, "with respect to opportunities, which is more important: social or political?" to input values of a pairwise comparison of the social and political opportunities nodes. Also, the process 501 can transform the input values into priority vectors in accordance with known techniques. Further, the process 501 can store the new or modified input values and the priority vectors into the ANP control structure.

The process 501 loops to continue inputting 505 pairwise comparisons, ANP ratings, and/or ANP client data, until done 507 inputting pairwise comparisons or other input. The user can signal that it is finished, or the input can be determined as complete when the ANP control structure is completely assigned values, or when timed out, or similar. This loop can be omitted if it is desired for the process to fully update the display for each change in value.

When done inputting the pairwise comparisons or other input, the process 501 can attach 509 one or more subnetworks to a node-to-cluster connection in the ANP control structure, instead of attaching a subnetwork to the node itself as in a conventional ANP control structure. (This can also be done before inputting the pairwise comparisons or other input.) The subnetwork can include a prioritizer and one of predetermined synthesizers, as discussed elsewhere, for use specifically on the connected node and cluster.

The process 501 can perform 511 a BOCk calculation on the ANP control structure with feedback throughout, to yield a result which is proper. In an ANP v2 control structure, the result can be proper according to ANP theory when values are non-trivial values. In contrast, in a conventional ANP control structure, the result is not proper when values are non-trivial values, for example due to the matrix mathematics which are employed on the control structure. One of skill in the art will understand what an improper result means. "Non-trivial values", as defined herein, means (i) non-zero ANP alternatives of invert and add are under costs and/or risks in the ANP control structure using a subtraction formula, or (ii) non-zero ANP alternatives of positives minus negatives are under costs and/or risks in the ANP control structure using a subtraction formula, or (iii) ANP alternatives which do not have a value of 0.5 are under costs or risks in the ANP control structure using a probabilistic formula. Non-trivial values do not include (i) ANP alternatives having a zero value under costs and/or risks in the ANP control structure using a subtraction formula, or (ii) ANP alternatives having a zero value of positives minus negatives under costs and/or risks in the ANP control structure using a subtraction formula, or (iii) ANP alternatives having a value of 0.5 under costs or risks in the ANP control structure using a probabilistic formula. Trivial values are balanced or zero and hence can work properly for both positive and negative evaluations. The BOCR calculation is discussed in depth below.

The process 501 can output 513, for display, more than two contiguous levels of the ANP control structure with feedback between the more than two contiguous levels. This was discussed previously and will not be repeated here.

When completed, the process 501 can end. Alternatively, the process can loop back to await further input 505 of pairwise comparisons, ANP ratings, and/or ANP client data.

Throughout this document, "ANP v2" refers to the ANP control structure with feedback throughout. ANP v2 seeks to expand the theoretical and actual structures available to decision makers.

The following sections outline the ANP control structure with feedback throughout in relation to the "prioritizer" feature. One change in ANP theory is the addition of the "prioritizer" feature. As we will see, this addition can simplify the overall process, allow for more flexible structures and clarify the process of subnetworks conceptually.

The term "prioritizer" as used herein is defined as something that assigns a numerical value to each element of a group of plural alternatives; the numerical values can be obtained in many different fashions depending on the type of prioritizer used (i.e. for a pairwise comparison prioritizer the user would input pairwise comparisons, similarly for ratings, direct data, and networks). An alternative is something that is being prioritized (i.e. something one wishes to know the importance of), and include those entities that are known as "alternatives" as well as those entities known as "criteria" according to conventional ANP theory. In order to see this, let us frame each of the pieces of the conventional ANP theory in the language of Prioritizers as discussed herein.

"Pairwise comparison." The point of a pairwise comparison set is to arrive at the priorities of a group of things. These things may be criteria (so-called alternatives in the traditional ANP sense), or ratings scales. In ANP v2 these would all be denominated as "alternatives" of the given prioritizer, e.g., the pairwise comparison prioritizer.

"Ratings." If one thinks of a single column of the conventional ANP's rating system as conventionally represented in a matrix, its point is to assign ideal priorities to the alternatives (with respect to a criteria). That is, the ratings are prioritizing a collection of alternatives.

"ANP network." An overall goal of an ANP network is to assign priorities to its alternatives. (The fact that an ANP network has clusters, criteria, connections, and the like, is part of the process used to derive the priorities of the alternatives. However, those things should not distract us from an overall purpose of the network: to prioritize that network's alternatives.)

"Optimization." One point of optimizing is to tell us how much we should spend (in terms of time, money, etc.) on each alternative. Each of these amounts (also referred to as "values") is deemed to be a "priority" for an alternative. Taken together, these amounts can prioritize the alternatives (although the amount spent in a particular time period from a particular resource can be more useful).

"Subnetworks." In the current conventional ANP theory, a subnetwork can serve two distinct purposes. It first is used to hide structure away (or to store as a separate data structure) so that ANP models (as data structures) do not become unwieldy. The second is that subnetworks allow for BOCR type fonnulas to be utilized in calculations. As it stands in the current ANP theory, the inventors believe that too much useful information is hidden when subnetworks are used. For instance, you can never see your alternatives without digging sufficiently far into the structure, even though the whole point of the ANP model is to prioritize those alternatives. ANP v2 (compared to conventional ANP) differs substantially in how it handles subnetworks, and what their purpose is. Advantageously, any ANP subnetwork structure can be expressed in ANP v2 so that ANP v2 is backward compatible. However, in ANP v2 new structures are possible as well. In ANP v2, one point of a subnetwork is to prioritize a particular set of alternatives, for instance, to figure out how important, e.g., Social, Political, and Economic clusters are relative to a Benefits node. In ANP v2 one would have a Benefits node connect down to, e.g., the Social subnetwork, the Political subnetwork, and the Economic subnetwork. Then, to prioritize Social, Political, and Economic, one would have a subnetwork attached to the connection from Benefits to, e.g., Social, Political, and Economic, to contain the prioritizer (and possibly the synthesizer). (In contrast, in the current ANP theory, Benefits would be in a top level network, and there would be a subnetwork under Benefits that contained Social, Political, Economic as alternatives. We can see one of the weaknesses the current ANP theory: by looking at the ANP model containing benefits we do not immediately see what the point of the Benefits subnetwork is, without digging in deeper. In ANP v2 we immediately see what the point is: we see Benefits connecting down to Social, Political, Economic, and we see a subnetwork is attached that will derive their priorities.)

The following are some concrete examples of prioritizers:
Simple Sort Prioritizer:
This prioritizer sorts the alternatives to which it is assigned from highest to lowest, automatically without manual intervention. The prioritizer then assigns predetermined values to the alternatives, automatically without manual intervention. This can be a nice quick way to preliminarily prioritize alternatives, and the user can later go back to specify more exacting values (as in pairwise comparisons). For instance, if the alternatives are Car, Truck, Motorcycle, and the system sorts them as 1. Motorcycle 2. Truck 3. Car. The predetermined values which are assigned might be Motorcycle=1 Truck=0.6 Car=0.3

Google™ Score Prioritizer:

This prioritizer can automatically, without manual intervention, perform a Google™ (or other search engine) search for wording in an alternative, and return the number of websites that contain that wording from the alternative according to Google™ search. (Google provides a nice well defined api for doing such things.) Clearly the results will not be normalized in this prioritizer (it will return numbers of websites), but the system can easily normalize them.

Current Stock Price Prioritizer:

If the alternatives are companies that are publicly traded, the prioritizer can automatically without user intervention use Yahoo finance (for instance, or like on-line financial information systems) to obtain near real time stock prices, which would then be the priorities. As with the previous example, if normalized priorities are desired, the system can normalize those prices.

Regional Temperature Prioritizer:

If, for example, the alternatives are geographic regions (cities, counties, states, countries, or similar), the prioritizer can automatically without manual intervention access a weather website to obtain the current temperature for the geographic regions and use the obtained temperatures as the priorities. The system can normalize the data if desired to have normalized scores.

Now that we have seen how prioritizers relate to the current ANP theory (as well as somewhat how they fit into ANP v2), let us see some examples of new features they afford.

Simplification/Unification In the conventional ANP theory one does ratings only on certain decisions, pairwise in other places, subnetworks in others, optimization in still other places. In particular, optimization and subnetworks appear to be "bolted on concepts" that do not fully merge with the network process because their calculations are done separately with a separate logic, and they can only appear in limited contexts. With the Prioritizer feature of ANP v2, all of these disparate ideas can be represented as particular kinds of prioritizers. Thus in ANP v2 they can be used where they are deemed appropriate and useful (rather than only in predefined places), thus giving both added flexibility and overall simplification of the conceptual framework.

Subnetworks as "zooming in" In the conventional ANP theory, subnetworks are attached only to nodes, as mentioned earlier. So if one has a conventional three level BOCR ANP model opened, the only structure one sees is of the BOCR level. One sees nothing of, e.g., the Social, Political, Economic levels underneath, or that of the alternatives (which are the point of the entire model) without drilling down one or two levels respectively. In comparison, with subnetworks attached to a node-to-cluster connection in ANP v2, the node-to-cluster connection allows the Goal- ¿ BOCR- ¿ Social/Political/Economic- ¿ Alts structure to live in the top level network. This can give the user immediate information about the high level structure of the model. Then too, any particular subnetwork can be only one level down from the top level network. To access the Social Benefits subnetwork in a user interface, for example, one can simple "double click" on the connection from Social Benefits to AltsCluster.

Removes "control tree limitation" In the conventional ANP theory one can only ever have a control tree of subnetworks (Goal- ¿ BOCR- ¿ Social/Political/Economic). ANP v2 allows any ANP network to act as the control structure.

Mathematical Simplification. Conventional ANP theory has ratings, optimization, and subnetworks calculated at various stages after the bulk of the ANP calculations have occurred. ANP v2 remedies this patchwork approach by bringing the ANP calculations all under the same umbrella. For instance, in the current conventional ANP theory, one must first calculate a limit matrix to get column priorities to do ratings and the ratings are then handled separately using this. In ANP v2, anywhere a rating occurs it can simply be a prioritizer used to prioritize some alternatives. Those priorities can then be fed into the parent structure and used as appropriate there, without any need of knowing that they came from a ratings-type prioritizer.

The ANP calculations for ANP v2 have a very different limit matrix calculation to incorporate BOCR type calculations into the limit matrix procedure. The following section discusses the limit matrix calculation which includes the BOCR calculations for ANP v2.

1. Introduction

The new structures allowed in ANP v2 have a new limit matrix calculation that is capable of incorporating BOCR type formulas within the actual limit matrix calculation. In addition two new structures are provided to handle these formulas, which are discussed before the algorithm is discussed.

The first is the notion of a synthesizer. A synthesizer can handle feeding priorities through the system one step (this is the generalization of the multiply and add step). Although a synthesizer could be used to input BOCR type formula, in fact we can use an additional feature to make this easier. That feature is an inverter. An inverter describes how to invert priorities (this handles the subtraction piece of BOCR). Then, the typical BOCK formula is the multiply and add formula, but we set certain columns of the ANP control structure (represented in a matrix) to use an inverter which handles the subtraction component of BOCR.

2. Definitions and Notations

To describe the ANP v2 limit matrix calculation, we make a few definitions below, and develop a systematic notation for the pieces involved. Before getting to definitions, let us spell out some conventions we will follow.

Numbers: Single numbers (integer or real) are denoted with lower case letters. Thus $i, x, y, t$ all denote single numbers.

Matrices and vectors: These are denoted by lower case letters. Thus $m, v$ denote matrices or vectors. The components of a vector or matrix are denoted by the same lower case letter, with appropriate subscripts. Thus if m is a matrix, $m_{r,c}$ denotes the entry in the $r^{th}$ row and $c^{th}$ column. If v is a vector, then $v_i$ denotes the $i^{th}$ component of v.

Functions: These are denoted by capital letters. Thus $S, F, G$ denote functions of one sort or another.

Spaces: These are denoted by capital letters. Thus $P, I, M$ denote spaces.

2.1 Definitions

The one dimensional space of real numbers will be denoted by R.

The space of all priority vectors of dimension d is denoted by $P^d$. It can be defined to be the space $$P^d = \{x \square R^d | \text{ so that for all } i, x_i \geq 0 \text{ and } \Sigma x_i = 0 \text{ or } 1\} \quad \text{(Equation 1)}$$

The space of all matrices of size n rows by k columns is $$M_{n,k}. \quad \text{(Equation 2)}$$

The space of all matrices of size n rows by k columns such that each entry is between negative one and positive one is $$I_{n,k} = \{m \in M_{n,k} | \text{ for all } i,j -1 \leq m_{i,j} \leq 1\} \quad \text{(Equation 3)}$$

Incidentally, I was chosen because we call such things idealized that fall between −1 and 1.

The space of all column vectors of dimension d that can occur in a matrix of I is $$V^d = \{x \in R^d | \text{ for all } i, -1 \leq x_i \leq 1\} \quad \text{(Equation 4)}$$

A synthesizer S for n alternatives with k criteria is a mapping of the following form $$S: P^k \times I_{n,k} \to V^n \quad \text{(Equation 5)}$$

An inverter I of dimension d is a mapping of the following form $$I: V^d \to V^d \quad \text{(Equation 6)}$$

2.2 Notation

Indexing nodes: Nodes can be indexed by their global position in the network (this is an integer, and generally will be represented by n when appropriate). Or it can be represented by the position of the cluster it is in, and the position of the node within that cluster. In this form we would write c:n where c is the cluster number and n is the number of the node within cluster c.

$p_{n,c}$: This is the local priority vector with respect to node n (global position of that node) and nodes in cluster c. Thus $$p_{n,c} \in P^k \text{ if there are k nodes in cluster c.} \quad \text{(Equation 7)}$$

$p_c$: This is the local priority vector of the other clusters with respect to cluster c. Thus if there are l clusters we have $$p_c \in P^l. \quad \text{(Equation 8)}$$

m: This is the matrix of ideal priorities for the entire network. That is the local priorities, in their idealized form are used to fill in the values. This is the ideal form of the unsealed supermatrix.

$m^{(k)}$: This is the ideal matrix after synthesizing k steps.

$m_n$: If n is the global index of a node this is the $n^{th}$ column of the matrix m.

$m_c$: If c is the index of a cluster, then $m_c$ is the submatrix of m of the columns of the nodes in cluster c. Note: there is some ambiguity between $m_n$ and $m_c$ because both subscripts are simply integers. However, in all cases below we know whether the subscript is indexing nodes or clusters, and thus can differentiate between these two cases.

$S_{n,c}$: If n is the index of a node, and c is the index of a cluster, $S_{n,c}$ is the synthesizer for that node to cluster connection (if there is no such connection, the synthesizer is immaterial). To be a bit more precise, if cluster c has k nodes in it and the network has a nodes altogether then $$S_{n,c}: P^k \times I_{a,k} \to V^a \quad \text{(Equation 9)}$$

$S_c$: If c is the index of a cluster, $S_c$ is the synthesizer with respect to cluster c. Thus if there are l clusters in the network and a alternatives we have $$S_c: P^l \times I_{a,l} \to V^a \quad \text{(Equation 10)}$$

$I_{n,c,i}$: This is the inverter formula to use for criteria i when using synthesizer $S_{n,c}$. If there are a nodes in the network altogether, then $$I_{n,c,i}: V^a \to V^a \quad \text{(Equation 11)}$$

$I_{c,i}$: This is the inverter formula to use for cluster i when using synthesizer $S_c$. If there are a nodes in the network altogether, then $$I_{c,i}: V^a \to V^a \quad \text{(Equation 12)}$$

$r_{n,c}^{(k)}$: This is an intermediate calculated value used as part of the synthesis process at step k. We have n as the node column we are working on and c is the index of the cluster we are synthesizing with respect to. This value is used to eventually arrive at the column $m_n^{(k)}$. If there are a nodes in the network, then we have $$r_{n,c}^{(k)} \in V^a. \quad \text{(Equation 13)}$$

$r_n^{(k)}$: This is the matrix formed by gluing together all column vectors $r_{n,c}^{(k)}$ as c ranges over all clusters in the network. Thus if the network has l clusters and a nodes $$r_n^{(k)} \in I_{a,l} \quad \text{(Equation 14)}$$

3. The Algorithm

The algorithm can break down into two pieces:
1. Calculating $m^{(k+1)}$ when $m^{(k)}$ is known.
2. Looking for $m^{(k)}$ to converge for large values of k.

We will start with the computation of $m^{(k+1)}$, which we call a synthesis iteration.

3.1 Synthesis Iteration

This is an iterative process, and thus we need to start somewhere. We start with $$m^{(0)} = m: \quad \text{(Equation 15)}$$

In other words we start with the initial ideal supermatrix.

At a given step we synthesize to find new columns for our next step. So we fill in one column at a time for the next step matrix. We compute a column for the next step in two phases.
1. We first synthesize with respect to nodes. This gives an intermediate result we will feed into the cluster phase.
2. We use those values and synthesize with respect to the clusters.

Let us fix now the column we are synthesizing, say column n (this is synthesizing the priorities of all of the other nodes with respect to node n in the next step, hence the use of n to represent the column). Let us also fix the step we are at, k+1 (so we have already calculated $m^{(k)}$. We need to calculate $$m_n^{(k+1)} \quad \text{(Equation 16)}$$

3.1.1 Node Synthesis

We need to calculate $$r_{n,c}^{(k+1)}$$

as c ranges over all clusters in the network. This is calculated by the formula, Formula 1:

To synthesize the next level of intermediate priorities, use the following formula $$r_{n,c}^{(k+1)} = S_{n,c}(p_{n,c}, \tilde{m}_c^{(k)}) \quad \text{(Equation 17)}$$

where the columns of $\tilde{m}_c^{(k)}$ are found by applying the appropriate inverter to each column of $m_c^{(k)}$, in other words the $i^{th}$ column is $$\tilde{m}_{c,i}^{(k)} = I_{n,c,i}(m_{c,i}^{(k)}) \quad \text{(Equation 18)}$$

3.1.2 Cluster Synthesis

Now that we have the intermediate values for the priorities with respect to node n for all clusters c $$r_{n,c}^{(k+1)}$$

we have the matrix $r_n^{(k+1)}$ which contains all of those column vectors. We can now synthesize those together to finish of this column of the new matrix.

Formula 2: To synthesize column n (which lives in cluster c) to get the k+1 iteration of synthesis we use $$m_n^{(k+1)} = S_c(p_c, \tilde{r}_n^{(k+1)}) \quad \text{(Equation 19)}$$

where the columns of $\tilde{r}^{(k+1)}$ are found by applying the appropriate inverter to each column of $r^{(k)}$, in other words the $i^{th}$ column is $$\tilde{r}_{n,i}^{(k+1)} = I_{c,i}(r_{n,i}^{(k+1)})$$

3.2 Limit

The limiting calculation simply looks at the iterations of the $m^{(k)}$ as $k \to \infty$. Notice that for all k $$m^{(k)} \in I_{a,l} \quad \text{(Equation 20)}$$

which is a compact space. Thus at least some subsequence of the $m^{(k)}$ will converge (although there is no guarantee about how far out this convergence will occur, or if it will be a regular pattern). As currently implemented we search for convergence patterns out to a point, and if none are found we give up.

For specific synthesizers (the traditional ones, for instance) we have some guarantees about convergence (it will either converge to a single matrix, or converge to a cycle). For more exotic synthesizers there is no currently available theory known to the inventors that will yield similar behavior. Thus, searching for convergence can be a subtle issue.

4 A Note on Synthesizers

Anything that follows the definition of synthesizers presented above may work according to this theory. However with simply the old fashioned "multiply and add" synthesizer we get the entirety of the conventional ANP theory. This is because we also have the inverter playing a role. That inverter will handle the negative aspects of CR in BOCR, and thus we are reduced to a "multiply and add" situation.

We also have implemented the exponential equivalent of multiply and add, which is raise to a power and multiply (to implement the BOCR formulas that use multiplication).

Finally, it should be noted that although both of these synthesizers proceed alternative by alternative (e.g., row by row), so that there is no effect of one alternative on the other (no row effects the others), this need not be the case.

Any synthesizer that satisfies our definition may work within the confines of this algorithm. So many more esoteric syinthesizers are possible.

5 A Note on Inverters

There are several currently implemented inverters. However, much like synthesizers, the possibilities are endless. The current inverters include, for example:

Empty inverter. This does nothing at all.

Probabilistic inverter. This inverts by doing 1 minus. So if an entry is, e.g., 0.75, this inverter would turn it into 1−0.75=0.25.

Negative inverter. This inverts by multiplying by minus 1. So if an entry is, e.g., 0.25, this inverter turns it into −0.25. If the entry is, e.g., −0.73 this inverter turns it into 0.73.

Reciprocal Normal inverter. This inverter takes the multiplicative inverse of each entry then normalizes so that the new vector sums to 1. So if the values are, e.g., 0.5, 0.25, 0.1, 1 the new values would be (before normalizing) 2, 4, 10, 1, and after normalizing 2/17, 4/17, 10/17, 1/17.

Reciprocal Ideal inverter. This inverter is similar to the last, except it reidealizes, that is divides by the largest. So if we start with the same values as the previous example, namely 0.5, 0.25, 0.1, 1 we have 2, 4, 10, 1 before reidealizing. To reidealize we have to divide by the largest, which is 10. Thus this inverter would spit back 2/10, 4/10, 10/10, 1/10, i.e. 0.2, 0.4, 1, 0.1.

6 A Note on Hierarchies

Hierarchies, much as in traditional ANP theory, are best handled separately. In traditional ANP calculations, we can wedge hierarchies into the general limit matrix calculations. However, that does not yield all of the information one would like to have. Similarly one could try to wedge hierarchies into this calculation framework, but the results would not be what one would like.

Thus they need to be handled separately. The algorithm is very similar in feeling to the above algorithm, the only difference is one does it a level at a time. That is, to figure out which level we are in, we score each node with a non-negative integer describing how far up the hierarchy it falls. The bottom level is scored at 0. The other nodes are score by taking the maximum of the scores of the nodes it is connected to, and then adding 1. So, something that connects to level 0, 1, and 4 would be in level 5 (the max of the nodes it connects to is 4, then add one).

We then synthesize from the bottom upwards. The bottom level gets zeros for its columns in the limit matrix. Any level above synthesizes its column with any columns that connect to it, in the same way as synthesizing a single column at the k+1 step described in the general setting. This then gives the global limit matrix, which has as its columns the full synthesis information of each node.

7 A Note on Global Priorities

Unlike the traditional ANP limit matrix calculations, these new calculations need not converge to a matrix where all columns are the same (or converge to a cycle). In fact, in simple cases we see the limit matrix converge to a matrix with differing columns. Thus we have an issue: how do we get a global priority vector from these differing columns?

The solution is straight forward. We have a traditional unscaled and scaled supermatrix (ignoring the synthesizer data). And we can compute the traditional limit matrix, to arrive at priorities for the columns of our limit matrix taken using the new algorithm. We can use these priorities to take the weighted average of the columns of the limit matrix calculated with the new algorithm, to arrive at a global priorities vector. In fact, one can also specify to only include a limited number of columns in the global priority calculation. (For instance, if we have a BOCR model that splits into Social, Political, Economic at each level, and we include feedback, we could specify to use only the BOCR columns for the global priority calculation. Note, if there were no feedback, the BOCk with Social, Political, and Economic would feed from a goal node, and that would be the node to get the global priorities from, so this extra step is not needed in the hierarchy case.)

8 A Note on Backward Compatibility

This discussion would not be complete without mentioning that any traditional ANP model can be framed in this theory and will calculate precisely the same values in the new theory as in the old. This theory adds many different possibilities for additional structure as well as clarity of presentation; however, it does not sacrifice consistency with the current theory to accomplish this.

The designation "pairwise comparison" is used herein to indicate a process of comparing content category alternatives in pairs to judge which of each pair is preferred, or has a greater amount of some quantitative property, as well as the strength of the preference between the content category alternatives.

The term "analytic network process control structure" ("ANP control structure"), sometimes referred to as an ANP model, ANP network model, or similar, is used herein to refer to a form of an analytic hierarchy process (AHP) in which higher level elements interact with lower level elements and take the dependency of the elements into account; further in the ANP control structure, the inportance of the criteria determines the importance of the alternatives (as in an AHP), and the importance of the alternatives themselves determines the importance of the criteria. The ANP control structure has cycles connecting elements in a cluster and loops connecting the cluster to itself, as is known to one of skill in the art. The term "ANP v2" is used to distinguish a type of ANP which is different from conventional ANP (also referred to as traditional ANP, or similar).

The term "feedback throughout the control structure" used in connection with "ANP control structure" (e.g., "ANP control structure with feedback throughout," or similar) is specifically defined to mean a novel ANP control structure that permits feedback directly between two or more sibling subnetworks, sometimes referred to as "ANP v2 control structure", to be contrasted with a conventional ANP control structure in which there is no direct feedback between sibling subnetworks; or with feedback upwards, to be contrasted with a conventional ANP in which there is no feedback upwards, for example up to BOCR.

When used in connection with conventional ANP, the terms "cluster" and "subnetwork" are used specifically as understood in the field of ANP as distinguished from other fields.

The term "ANP v2 control structure" means the novel ANP control structure with feedback throughout; the term is a shorthand designation. Similarly, the term "ANP v2 model" means the novel ANP model for an ANP control structure with feedback throughout. The designation "ANP v2" is coined and used herein to indicate the novel ANP control structure with feedback through and related structures and methods, which are distinguished from conventional ANP.

The term "BOCR calculations" is used herein to mean benefits opportunities costs risks (BOCR) calculations which are performed on an analytic network process. When the BOCR calculations are performed on the ANP control structure with feedback throughout the control structure, the BOCR calculation on the ANP control structure is correct when (i) non-zero ANP alternatives of invert and add, or positives minus negatives, are under ANP costs or risks using a subtraction formula, or (ii) non-0.5 ANP alternatives are under ANP costs or risks using a probabilistic formula.

The term "non-zero ANP alternatives of invert and add" (sometimes referred to herein as "invert and add") is defined herein to mean a pair of ANP alternatives under costs or risks that each individually has a non-zero value; a zero value assigned to an alternative indicates that the alternative with that value has no influence on other elements in its cluster.

The term "non-zero ANP alternatives of positives minus negatives" (sometimes referred to herein as "positives minus negatives") is defined herein to mean a pair of ANP alternatives under costs or risks that have values resulting in a negative value being subtracted from a positive value when the BOCR calculation is applied; a zero value assigned to an alternative indicates that the alternative with that value has no influence on other elements in its cluster.

The term "subtraction formula" is used herein to refer to a well known BOCR formula in an ANP control structure; in a "subtraction formula," an equation expresses a function of the difference of two quantities in terms of functions of the quantities themselves.

The term "probabilistic formula" is used herein to refer to a well known BOCR formula in an ANP control structure; a probabilistic formula takes the form f>0 where f is the formula.

The term "non-0.5 ANP alternatives" is defined herein to mean a pair of ANP alternatives under ANP costs or risks which at least one of the alternatives in the pair does not have the value "0.5" when interpreted according to standard ANP theory and accordingly an evaluation of the alternatives results in a non-zero value.

The term "proper according to ANP theory" means that an ANP calculation on the ANP control structure with feedback throughout, for example, using matrix multiplication as is known in the field of ANP.

The above is sometimes described in terms of a single user, for ease of understanding and illustration. However, it is understood that multiple users can be accommodated in various embodiments. For example, multiple users each can input pairwise comparisons.

The foregoing description suggests that one or more embodiments include a communications capability. Devices providing communications capability can include those providing or facilitating voice communications services or data or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof. Moreover, the communications capability that may be utilized in connection with one or more embodiments can include, for example, short range wireless communications capability normally referred to as WLAN (wireless local area network) capabilities, using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System), and/or other protocol structures. Alternatively communications may be provided in a wireline and/or wireless environment, for example, in accordance with a LAN using protocols such as TCP/IP, UDP/UP, IPX/SPX, or Net BIOS via a hardwired interface such as a cable and/or a connector or wireless interface. Moreover, communications may be provided by variations, extensions, evolutions, and/or combinations of such communications capabilities.

Furthermore, the devices of interest may include, without being exhaustive, general purpose computers, specially programmed special purpose computers, personal computers, distributed computer systems, calculators, handheld computers, keypads, laptop/notebook computers, mini computers, mainframes, super computers, personal digital assistants, communication devices, as well as networked combinations of the same, and the like, although other examples are possible as will be appreciated by one of skill in the art, any of which can be referred to as "computer-implemented system."

One or more embodiments may rely on the integration of various components including, as appropriate and/or if desired, hardware and software servers, database engines, and/or other content providers. One or more embodiments may be connected over a network, for example the Internet, an intranet, or even on a single computer system. Moreover, portions can be distributed over one or more computers, and some functions may be distributed to other hardware, in accordance with one or more embodiments.

Further, portions of various embodiments can be provided in any appropriate electronic format, including, for example, provided over a communication line as electronic signals, provided on floppy disk, provided on CD ROM, provided on optical disk memory, etc.

Any presently available or future developed computer software language and/or hardware components can be employed in various embodiments. For example, at least some of the functionality discussed above could be implemented using C, C++, Java or any assembly language appropriate in view of the processor being used.

One or more embodiments may include a process and/or steps. Where steps are indicated, they may be performed in any order, unless expressly and necessarily limited to a particular order. Steps that are not so limited may be performed in any order.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer-implemented system for an analytic network process (ANP) control structure with feedback throughout the ANP control structure, comprising:
    a memory configured to store an ANP control structure; and
    a processor cooperatively operable with the memory, the processor configured to:
        store, in the memory, the ANP control structure with feedback throughout the ANP control structure;
        perform a BOCR calculation on the ANP control structure with feedback throughout the ANP control structure, to yield a result which is proper according to ANP theory when values are non-trivial; and
        store, in the stored ANP control structure, subnetworks according to ANP theory, one of the subnetworks being attached to a node-to-cluster connection in the ANP control structure instead of being attached to the node itself,
    the non-trivial values when the result is proper being when non-zero ANP alternatives of invert and add, or positives minus negatives, are under costs or risks in the ANP control structure using a subtraction formula.

2. The system of claim 1, further comprising:
    an output unit configured to output, for simultaneous display to a user, more than two contiguous levels of the ANP control structure with feedback between said more than two contiguous levels.

3. The system of claim 1, further comprising:
    an output unit configured to output, for a display to a user, a result of the calculations on the ANP control structure with feedback.

4. The system of claim 1, the non-trivial values when the result is proper being when non-0.5 ANP alternatives are under costs or risks in the ANP control structure using a probabilistic formula.

5. The system of claim 1, further comprising
    an input unit configured to input, from an input device, pairwise comparisons, ANP ratings, or ANP client data, which are transformed into priority vectors and stored into the ANP control structure representing, the pairwise comparisons representing a user's judgment of priority between the ANP alternatives in the pair, the ANP ratings representing a user's rating of a choice, and the ANP client data representing real world values.

6. A computer-implemented system for an analytic network process (ANP) control structure with feedback throughout the ANP control structure, comprising:
    an ANP control structure storage unit that stores an ANP control structure with feedback throughout the ANP control structure;
    a synthesizer that performs a BOCR calculation on the ANP control structure with feedback throughout the ANP control structure, to yield a result which is proper according to ANP theory when values are non-trivial;
    an input unit configured to input, from an input device, pairwise comparisons for pairs of ANP alternatives into the stored ANP control structure representing, the pairwise comparisons representing a user's judgment of priority between the ANP alternatives in the pair; and
    an output unit configured to output, for a display to a user, more than two contiguous levels of the ANP control structure with feedback,
    the stored ANP control structure being configured to include subnetworks according to ANP theory, one of the subnetworks being attached to a node-to-cluster connection in the ANP control structure stored in the ANP control structure storage unit instead of being attached to the node itself,
    the non-trivial values when the result is proper being when (i) non-zero ANP alternatives of invert and add, or positives minus negatives, are under costs or risks in the ANP control structure using a subtraction formula, or (ii) non-0.5 ANP alternatives are under costs or risks in the ANP control structure using a probabilistic formula.

7. A computer-implemented method for an analytic network process (ANP) control structure with feedback throughout the ANP control structure, comprising:
    storing, in an ANP control structure storage unit, an ANP control structure with feedback throughout the ANP control structure; and
    performing, in a synthesizer of a computer processor, a BOCR calculation on the ANP control structure with feedback throughout the ANP control structure, to yield a result which is proper according to ANP theory when values are non-trivial,
    the stored ANP control structure being configured to include subnetworks according to ANP theory, one of the subnetworks being attached to a node-to-cluster connection in the ANP control structure stored in the ANP control structure storage unit instead of being attached to the node itself,
    the non-trivial values when the result is proper being when non-zero ANP alternatives of invert and add, or positives minus negatives, are under costs or risks in the ANP control structure using a subtraction formula.

8. The method of claim 7, further comprising:
outputting, from an output unit, for a display to a user, more than two contiguous levels of the ANP control structure with feedback between said more than two contiguous levels.

9. The method of claim 7, further comprising:
outputting, from an output unit, for a display to a user, a result of the calculations on the ANP control structure with feedback.

10. The method of claim 7, the non-trivial values when the result is proper being when non-0.5 ANP alternatives are under costs or risks in the ANP control structure using a probabilistic formula.

11. The method of claim 7, further comprising inputting, from an input device, pairwise comparisons, ANP ratings, or ANP client data, which are transformed into priority vectors and stored into the ANP control structure representing, the pairwise comparisons representing a user's judgment of priority between the ANP alternatives in the pair, the ANP ratings representing a user's rating of a choice, and the ANP client data representing real world values.

12. A non-transitory computer-readable storage medium encoded with a computer program for an analytic network process (ANP) control structure with feedback throughout the ANP control structure, wherein execution of said computer program by one or more processors causes said one or more processors to perform the steps of:
storing, in an ANP control structure storage unit, an ANP control structure with feedback throughout the ANP control structure; and
performing, in a synthesizer, a BOCR calculation on the ANP control structure with feedback throughout the ANP control structure, to yield a result which is proper according to ANP theory when values are non-trivial,
the stored ANP control structure being configured to include subnetworks according to ANP theory, one of the subnetworks being attached to a node-to-cluster connection in the ANP control structure stored in the ANP control structure storage unit instead of being attached to the node itself,
the non-trivial values when the result is proper being when (i) non-zero ANP alternatives of invert and add, or positives minus negatives, are under costs or risks in the ANP control structure using a subtraction formula.

13. The non-transitory computer-readable storage medium of claim 12, further comprising instructions for:
outputting, from an output unit, for a display to a user, more than two contiguous levels of the ANP control structure with feedback between said more than two contiguous levels.

14. The non-transitory computer-readable storage medium of claim 12, further comprising instructions for:
outputting, from an output unit, for a display to a user, a result of the calculations on the ANP control structure with feedback.

15. The non-transitory computer-readable storage medium of claim 12, the non-trivial values when the result is proper being when non-0.5 ANP alternatives are under costs or risks in the ANP control structure using a probabilistic formula.

16. The non-transitory computer-readable storage medium of claim 12, further comprising instructions for inputting, from an input device, pairwise comparisons, ANP ratings, or ANP client data, which are transformed into priority vectors and stored into the ANP control structure representing, the pairwise comparisons representing a user's judgment of priority between the ANP alternatives in the pair, the ANP ratings representing a user's rating of a choice, and the ANP client data representing real world values.

17. A computer-implemented system for an analytic network process (ANP) control structure with feedback throughout the ANP control structure, comprising:
a memory configured to store an ANP control structure; and
a processor cooperatively operable with the memory, the processor configured to:
store, in the memory, the ANP control structure with feedback throughout the ANP control structure; and
perform a BOCR calculation on the ANP control structure with feedback throughout the ANP control structure, to yield a result which is proper according to ANP theory when values are non-trivial,
wherein the BOCR calculation is performed consistent with the following calculation:
calculate $$r_{n,c}^{(k+1)}$$

as c ranges over clusters in the ANP control structure, consistent with the formula:

$$r_{n,c}^{(k+1)} = S_{n,c}(p_{n,c}, \tilde{m}_c^{(k)})$$

where
m is a supermatrix,
r is a column,
c is an index of a cluster,
n is an index of a node,
k is an iteration of synthesis,
p is a priority vector, and
$S_{n,c}$ is a synthesizer with respect to connection between cluster c and node n.

18. A computer-implemented system for an analytic network process (ANP) control structure with feedback throughout the ANP control structure, comprising:
a memory configured to store an ANP control structure; and
a processor cooperatively operable with the memory, the processor configured to:
store, in the memory, the ANP control structure with feedback throughout the ANP control structure; and
perform a BOCR calculation on the ANP control structure with feedback throughout the ANP control structure, to yield a result which is proper according to ANP theory when values are non-trivial,
wherein the BOCR calculation is performed consistent with the following calculation:
calculate $$r_{n,c}^{(k+1)}$$

as c ranges over clusters in the ANP control structure, wherein:
columns of $\tilde{m}_c^{(k)}$ are found by applying an inverter to each column of $m_c^{(k)}$, an $i^{th}$ column being $$\tilde{m}_{c,i}^{(k)} = I_{n,c,i}(m_{c,i}^{(k)})$$

where
m is a supermatrix,
r is a column,
c is an index of a cluster,
n is an index of a node,
k is an iteration of synthesis,
$S_{n,c}$ is a synthesizer with respect to connection between cluster c and node n, and
$I_{n,c,i}$ is the inverter formula for criteria i when using synthesizer $S_{n,c}$.

19. A computer-implemented system for an analytic network process (ANP) control structure with feedback throughout the ANP control structure, comprising:
a memory configured to store an ANP control structure; and
a processor cooperatively operable with the memory, the processor configured to:
store, in the memory, the ANP control structure with feedback throughout the ANP control structure; and
perform a BOCR calculation on the ANP control structure with feedback throughout the ANP control structure, to yield a result which is proper according to ANP theory when values are non-trivial,
wherein the BOCR calculation is performed consistent with at least one of the following calculations:
calculate $$m_n^{(k+1)} = S_c(p_c, \tilde{r}_n^{(k+1)})$$

columns of $\tilde{r}^{(k+1)}$ being found by applying an inverter to columns of $r^{(k)}$, the $i^{th}$ column being $$\tilde{r}_{n,i}^{(k+1)} = I_{c,i}(r_{n,i}^{(k+1)})$$

where
m is a supermatrix
r is a column
c is an index of a cluster
n is an index of a node
k is an iteration of synthesis
p is a priority vector
$S_c$ is a synthesizer with respect to cluster c
$I_{c,i}$ is an inverter formula for cluster i when using synthesizer $S_c$.

20. A computer-implemented method for an analytic network process (ANP) control structure with feedback throughout the ANP control structure, comprising:
storing, in an ANP control structure storage unit, an ANP control structure with feedback throughout the ANP control structure; and
performing, in a synthesizer of a computer processor, a BOCR calculation on the ANP control structure with feedback throughout the ANP control structure, to yield a result which is proper according to ANP theory when values are non-trivial,
wherein the BOCR calculation is performed consistent with the following calculation:
calculate $$r_{n,c}^{(k+1)}$$

as c ranges over clusters in the ANP control structure, consistent with the formula:

$$r_{n,c}^{(k+1)} = S_{n,c}(p_{n,c}, \tilde{m}_c^{(k)})$$

where
m is a supermatrix,
r is a column,
c is an index of a cluster,
n is an index of a node,
k is an iteration of synthesis,
p is a priority vector, and
$S_{n,c}$ is a synthesizer with respect to connection between cluster c and node n.

21. A computer-implemented method for an analytic network process (ANP) control structure with feedback throughout the ANP control structure, comprising:
storing, in an ANP control structure storage unit, an ANP control structure with feedback throughout the ANP control structure; and
performing, in a synthesizer of a computer processor, a BOCR calculation on the ANP control structure with feedback throughout the ANP control structure, to yield a result which is proper according to ANP theory when values are non-trivial,
wherein the BOCR calculation is performed consistent with the following calculation:
calculate $$r_{n,c}^{(k+1)}$$

as c ranges over clusters in the ANP control structure, wherein:
columns of $\tilde{m}_c^{(k)}$ are found by applying an inverter to each column of $m_c^{(k)}$, an $i^{th}$ column being $$\tilde{m}_{c,i}^{(k)} = I_{n,c,i}(m_{c,i}^{(k)})$$

where
m is a supermatrix,
r is a column,
c is an index of a cluster,
n is an index of a node,
k is an iteration of synthesis,
$S_{c,n}$ is a synthesizer with respect to connection between cluster c and node n, and
$I_{n,c,i}$ is the inverter formula for criteria i when using synthesizer $S_{n,c}$.

22. A computer-implemented method for an analytic network process (ANP) control structure with feedback throughout the ANP control structure, comprising:
storing, in an ANP control structure storage unit, an ANP control structure with feedback throughout the ANP control structure; and
performing, in a synthesizer of a computer processor, a BOCR calculation on the ANP control structure with feedback throughout the ANP control structure, to yield a result which is proper according to ANP theory when values are non-trivial,
wherein the BOCR calculation is performed consistent with at least one of the following calculations:
calculate $$m_n^{(k+1)} = S_c(p_c, \tilde{r}_n^{(k+1)})$$

columns of $\tilde{r}^{(k+1)}$ being found by applying an inverter to columns of $r^{(k)}$, the $i^{th}$ column being $$\tilde{r}_{n,i(k+1)} I_{c,i}(r_{n,i}^{(k+1)})$$

where
m is a supermatrix
r is a column
c is an index of a cluster
n is an index of a node
k is an iteration of synthesis
p is a priority vector
$S_c$ is a synthesizer with respect to cluster c
$I_{c,i}$ is an inverter formula for cluster i when using synthesizer $S_c$.

23. A non-transitory computer-readable storage medium encoded with a computer program for an analytic network process (ANP) control structure with feedback throughout the ANP control structure, wherein execution of said computer program by one or more processors causes said one or more processors to perform the steps of:
storing, in an ANP control structure storage unit, an ANP control structure with feedback throughout the ANP control structure; and
performing, in a synthesizer, a BOCR calculation on the ANP control structure with feedback throughout the ANP control structure, to yield a result which is proper according to ANP theory when values are non-trivial, wherein the BOCR calculation is performed consistent with the following calculation:
calculate $$r_{n,c}^{(k+1)}$$

as c ranges over clusters in the ANP control structure, consistent with the formula:

$$r_{n,c}^{(k+1)} S_{n,c}(p_{n,c} \tilde{m}_c^{(k)})$$

where
- m is a supermatrix,
- r is a column,
- c is an index of a cluster,
- n is an index of a node,
- k is an iteration of synthesis,
- p is a priority vector, and
- $S_{n,c}$ is a synthesizer with respect to connection between cluster c and node n.

24. A non-transitory computer-readable storage medium encoded with a computer program for an analytic network process (ANP) control structure with feedback throughout the ANP control structure, wherein execution of said computer program by one or more processors causes said one or more processors to perform the steps of:

storing, in an ANP control structure storage unit, an ANP control structure with feedback throughout the ANP control structure; and performing, in a synthesizer, a BOCR calculation on the ANP control structure with feedback throughout the ANP control structure, to yield a result which is proper according to ANP theory when values are non-trivial, wherein the BOCR calculation is performed consistent with the following calculation:
calculate $$r_{n,c}^{(k+1)}$$

as c ranges over clusters in the ANP control structure, wherein:

columns of $\tilde{m}_c^{(k)}$ are found by applying an inverter to each column of $m_c^{(k)}$, an $i^{th}$ column being $$\tilde{m}_{c,i}^{(k)} = I_{n,c,i}(m_{c,i}^{(k)})$$

where
- m is a supermatrix,
- r is a column,
- c is an index of a cluster,
- n is an index of a node,
- k is an iteration of synthesis,
- $S_{n,c}$ is a synthesizer with respect to connection between cluster c and node n, and
- $I_{n,c,i}$ is the inverter formula for criteria i when using synthesizer $S_{n,c}$.

25. A non-transitory computer-readable storage medium encoded with a computer program for an analytic network process (ANP) control structure with feedback throughout the ANP control structure, wherein execution of said computer program by one or more processors causes said one or more processors to perform the steps of:

storing, in an ANP control structure storage unit, an ANP control structure with feedback throughout the ANP control structure; and performing, in a synthesizer, a BOCR calculation on the ANP control structure with feedback throughout the ANP control structure, to yield a result which is proper according to ANP theory when values are non-trivial, wherein the BOCR calculation is performed consistent with at least one of the following calculations:
calculate $$m_n^{(k+1)} = S_c(i\, p_c, \tilde{r}_n^{(k+1)})$$

columns of $\tilde{r}^{(k+1)}$ being found by applying an inverter to columns of $r^{(k)}$, the $i^{th}$ column being $$\tilde{r}_{n,i}^{(k+1)} = I_{c,i}(r_{n,i}^{(k+1)})$$

where
- m is a supermatrix
- r is a column
- c is an index of a cluster
- n is an index of a node
- k is an iteration of synthesis
- p is a priority vector
- $S_c$ is a synthesizer with respect to cluster c
- $I_{c,i}$ is an inverter formula for cluster i when using synthesizer $S_c$.

* * * * *